(12) United States Patent
Aoyagi

(10) Patent No.: US 8,606,003 B2
(45) Date of Patent: Dec. 10, 2013

(54) IMAGE PROCESSING DEVICE, IMAGE PROCESSING METHOD AND IMAGE PROCESSING PROGRAM

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 12/582,468

(22) Filed: Oct. 20, 2009

(65) Prior Publication Data

US 2010/0098333 A1    Apr. 22, 2010

(30) Foreign Application Priority Data

Oct. 22, 2008 (JP) ................................. 2008-271968

(51) Int. Cl.
    *G06K 9/36*    (2006.01)
(52) U.S. Cl.
    USPC .......................................... 382/166; 382/232
(58) Field of Classification Search
    USPC .................... 382/239, 234, 232, 166
    See application file for complete search history.

(56) References Cited

U.S. PATENT DOCUMENTS

| | | | | |
|---|---|---|---|---|
| 5,539,842 A | * | 7/1996 | Schwartz | 382/232 |
| 6,067,380 A | * | 5/2000 | Tanaka et al. | 382/232 |
| 2007/0076967 A1 | * | 4/2007 | Kim et al. | 382/239 |
| 2008/0175498 A1 | * | 7/2008 | Lee et al. | 382/238 |

FOREIGN PATENT DOCUMENTS

JP            9-327015 A       12/1997

* cited by examiner

*Primary Examiner* — Amir Alavi
*Assistant Examiner* — Kenny Cese
(74) *Attorney, Agent, or Firm* — Fitzpatrick, Cella, Harper & Scinto

(57) ABSTRACT

An image processing device and an image processing method provided herein are capable of achieving data compression with reduced image degradation even if the data is image data entered from an input device such as a scanner. The entered original image data is divided into 2×2 pixel blocks. Two-color-form compression processing and four-color holding compression processing are performed on a block-by-block basis. The compression result data which leads to a smaller one of the differences in gradation value between the original image data and the two-color-form compression difference data and between the original image data and the four-color compression difference data is output as the compression processing result of the block.

8 Claims, 20 Drawing Sheets

PIXEL PATTERN COLOR-AVERAGED TO ACHIEVE TWO-COLOR-FORM IS
REPRESENTED AS EACH OF THE ABOVE INFORMATION ITEMS BY 3 bits

:COLOR A-ASSIGNED PART      :COLOR B-ASSIGNED PART

0

USE OF PATTERN 「0」
TO SET FOUR-COLOR
HOLDING PROCESSING FLAG

IMAGE PROCESSING DEVICE, IMAGE PROCESSING METHOD AND IMAGE PROCESSING PROGRAM

BACKGROUND OF THE INVENTION

1. Field of the Invention

This invention relates to image processing performed in an image forming apparatus such as a multifunction printer (MFP). In particular, this invention relates to data compression processing using a method of limiting the number of colors employed in a certain area in order to reduce an amount of data (block approximation encoding).

2. Description of the Related Art

Recently, in various types of image forming apparatuses, the amount of data processed therein has been significantly increasing with the popularization of color images, an increase in the number of gradations, and the like. For overcoming this, various data compression techniques have been developed. One of the techniques is described, which is block approximation encoding for image compression. Specifically, a multi-gradation image is divided into pixel areas each containing a plurality of adjacent pixels. Then, each of the pixel areas is represented by a representative color of pixels the number of which is lower than the number of pixels within the area and pattern information indicative of locations of the representative color pixels. (See Japanese Patent Laid-Open No. H9-327015 (1997))

(First Problem)

The conventional block approximation encoding disclosed in Japanese Patent Laid-Open No. H9-327015 (1997) is a compression method that is effective for maintaining the high quality of images in regard to image data in which the number of used colors is limited to some extent, for example, print image data such as PDL data or computer graphics.

However, a reduction in the number of colors may possibly cause noticeable degradation in quality of an image of multi-gradation image data entered from an input device such as a scanner or a digital camera.

(Second Problem)

Under present circumstances, in the case of JPEG compression employed in a method for compressing multilevel image data, performing the compression and decompression processing to an edge of a letter in an image significantly causes degradation in image, resulting in noticeable degradation in image quality. The stronger the edge component, the more noticeable the degradation in image quality becomes.

For this reason, when the conventional block approximation encoding is employed for the compression and decompression processing, the edge component in the image uncompressed is made stronger, and JPEG processing makes the degradation of the edge of a letter more noticeable.

The present invention is made in view of the foregoing problems and an object of the present invention is to provide an image processing device and an image processing method which are capable of compressing data with minimization of image degradation even if the data is image data entered from an input device such as a scanner.

SUMMARY OF THE INVENTION

The present invention provides an image processing device comprising a unit configured to divide input image data into blocks each containing M×N pixels (M and N are each an integer of 1 or more, and at least one of M and N is an integer of 2 or more), a first compression unit configured to, in each of the blocks, sort colors included in the block into a smaller number of groups than the M×N to assign the colors to a smaller number of colors than the M×N, in order to compress the image data and obtain first compression result data, a second compression unit configured to, in each of the blocks, discard predetermined low-order bits of each of color components included in the block in order to compress the image data and obtain second compression result data, and an output unit configured to compare, for each of the blocks, a difference in gradation value between decompressed image data of the image data compressed by the first compression unit and the input image data with a difference in gradation value between decompressed image data of the image data compressed by the second compression unit and the input image data, and output either the first compression result data or the second compression result data which leads to a smaller one of the differences, as a compression processing result of the corresponding block.

The present invention makes it possible to provide satisfactory image quality even after compression and decompression by reducing the image degradation caused by reducing the number of colors which is a problem in conventional block approximation encoding process.

Further features of the present invention will become apparent from the following description of exemplary embodiments (with reference to the attached drawings).

DESCRIPTION OF THE EMBODIMENTS

Figure 1:
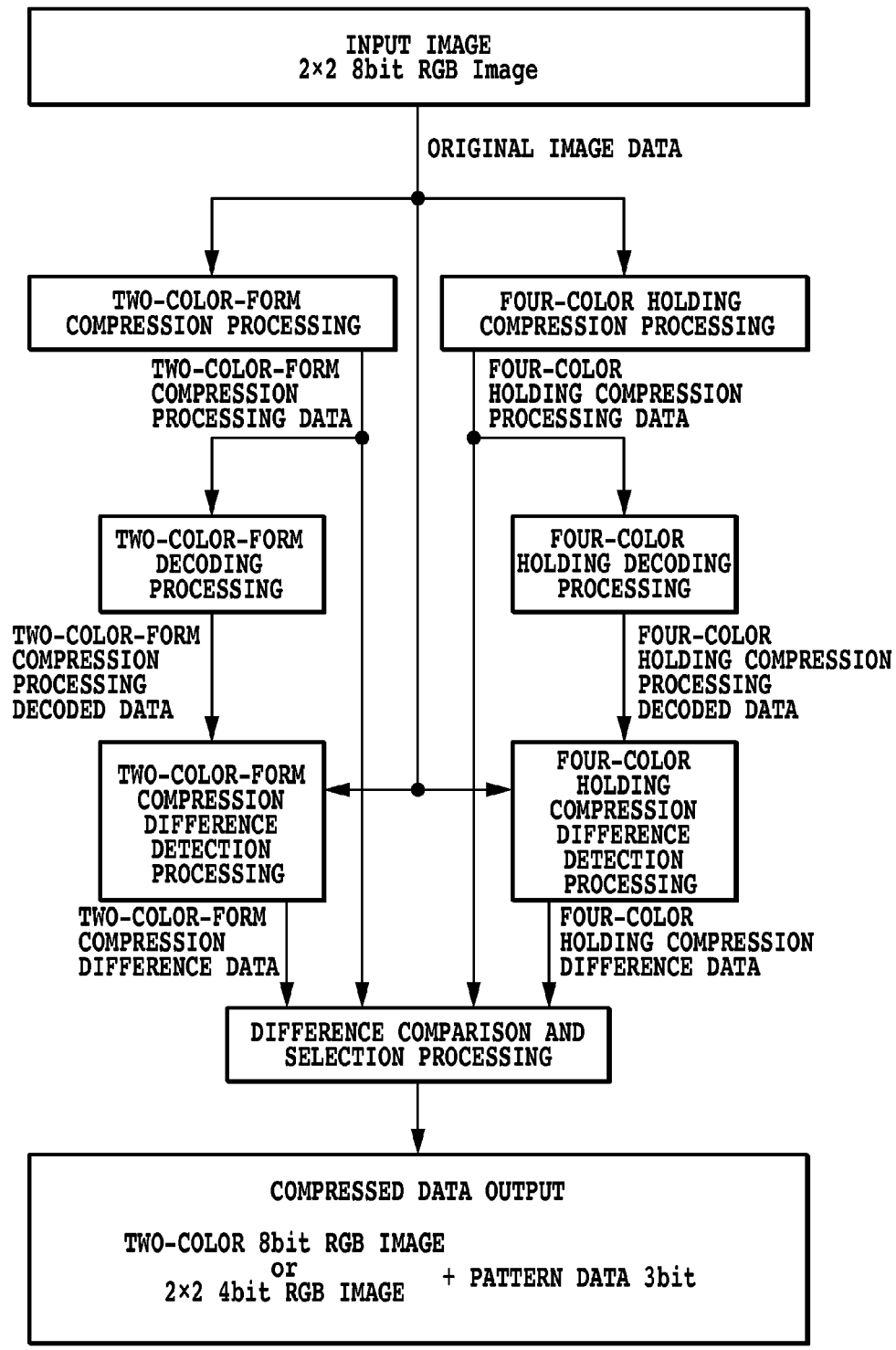
FIG. 1 is a diagram illustrating block approximation encoding compression processing according to an embodiment of the present invention.

Embodiments according to the present invention will be described below in detail with reference to the accompanying drawings. In the drawings described below, the components having the same function are designated with the same reference numerals and a repetition of the description is omitted.

In compression processing in an embodiment of the present invention, conventional block approximation coding can be performed in such a manner as to divide an image into specific areas and reduce the number of colors used in each area. Alternatively, a new type of block approximation coding as described below can be performed.

The new block approximation coding performs in parallel with original image data compression processing for holding the number of colors in which the amount of data is reduced by reducing the number of gradations used for representing each color without a change in the number of colors used in each area (number-of-colors holding compression processing). Then, there are compared decoding result data respectively obtained by decoding compression result data which are obtained through two-color-form compression processing, which will be described later, and compression result data which are obtained through the number-of-colors holding compression processing. Then, the compression result data due to a smaller difference among two differences by comparison between each of the two kinds of the decoding result data and the original image data is selected and output.

In an embodiment of the present invention, when any one of the respective compression result data is selected, edge information in the original image can be used to execute control for performing the processing of surely holding the number of colors on a block including an edge portion. This control allows prevention or a reduction of the image quality degradation of the text image after the JPEG compression and decompression processing.

For an image after the compression processing according to the embodiment of the present invention, if there are a mode in which the JPEG compression and decompression processing is not performed and a mode in which it is performed, the selection processing may be switched between the two compression processing results on the basis of the two modes.

In the mode in which the JPEG compression and decompression processing is not performed on the image after the compression processing according to the present invention, the processing causing a smaller difference between the decoding result data and the original image data is selected because the JPEG processing does not cause image degradation to occur in the edge portion of the image.

On the other hand, in the mode in which the JPEG compression and decompression processing is performed on the image after the compression processing according to the present invention, the result of four-color-form processing may be forcibly selected for the edge portion because the JPEG compression and decompression processing performed in a later stage causes image degradation to occur in the edge portion.

First Embodiment

In Regard to Image Forming Apparatus

Figure 10:
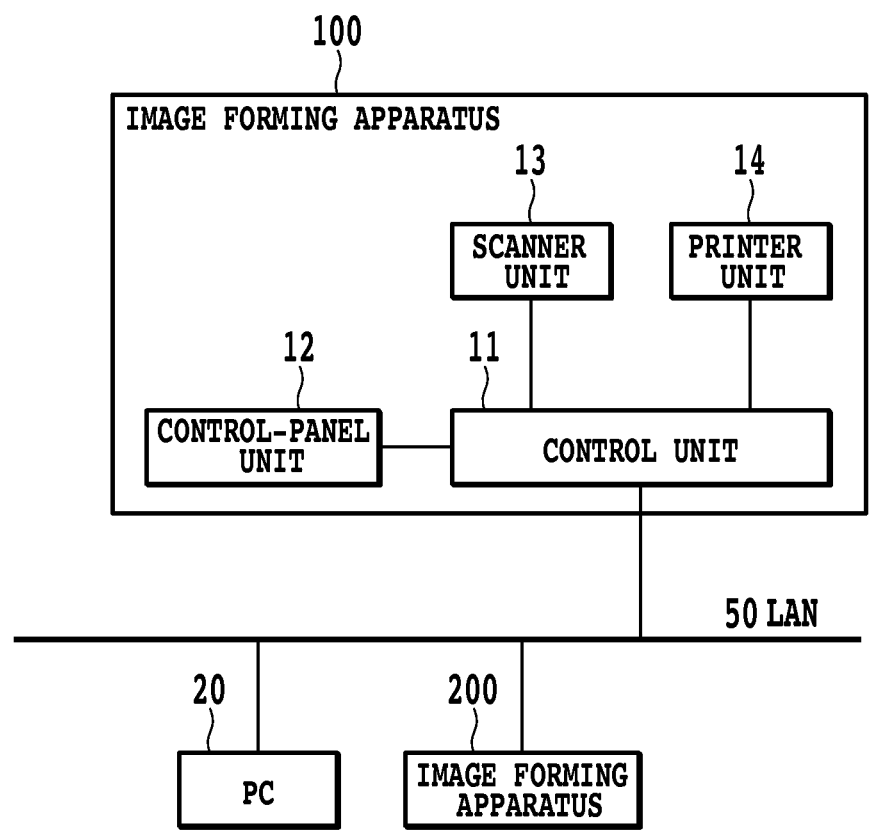
FIG. 10 is an internal block diagram of an image forming apparatus 100 in the embodiment of the present invention.

FIG. 10 is an internal block diagram of an image forming apparatus 100 in a first embodiment. The image forming apparatus 100 comprises a scanner unit 13 as an image input device, a printer unit 14 as an image output device, a control unit 11, and a control-panel unit 12 which is a user interface. The image forming apparatus 100 is connected to a LAN 50 and is capable of transmitting/receiving data to/from another image forming apparatus 200, a personal computer (PC) 20 and the like which are connected to the LAN 50.

Figure 11:
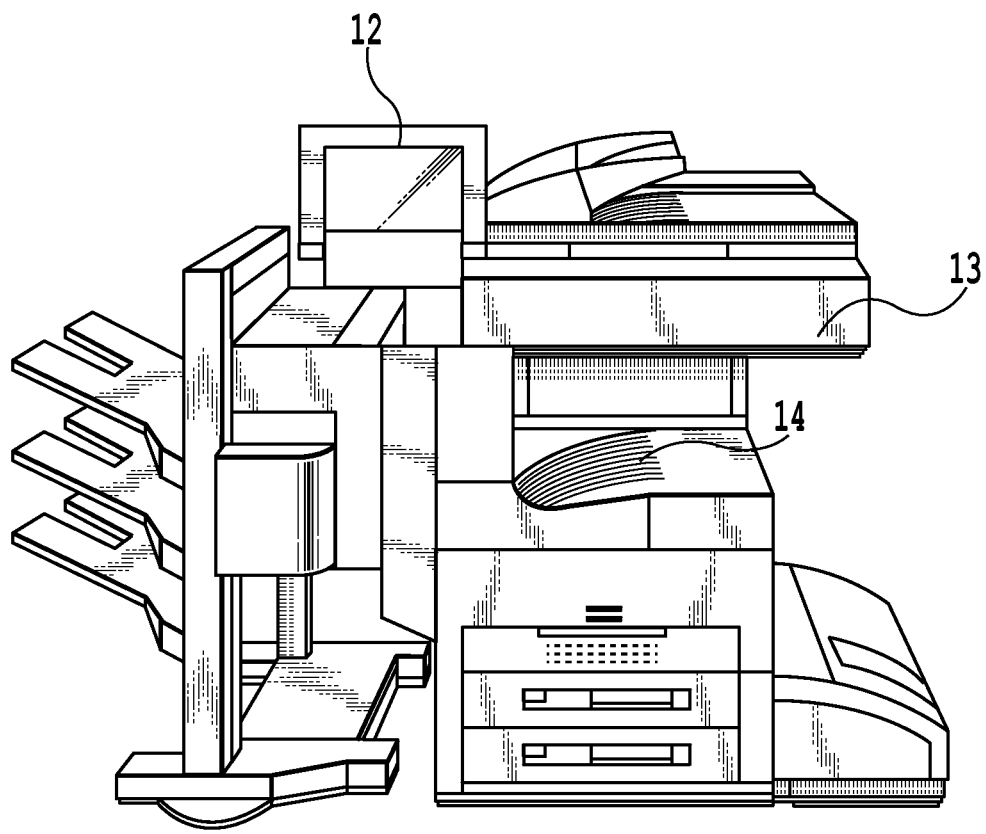
FIG. 11 is an external view of the image forming apparatus 100 in the embodiment of the present invention.

The outward appearance of the image forming apparatus 100 is illustrated in FIG. 11. The control-panel unit 12 includes a keyboard or various types of switches for entering given commands, data or the like. The control-panel unit 12 comprises a display unit for displaying various messages including an entry state and a setting state of the image forming apparatus 100. The scanner unit 13 scan-exposes an image on a document to light, and causes a CCD to receive the reflected light thus obtained to accomplish conversion from the image information into electrical signals. Then, the scanner unit 13 converts the electrical signals into luminance signals respectively for R, G and B colors, and outputs the luminance signals to the control unit 11 as image data. When a user operates the control-panel unit 12 to start the scanning process, the control unit 11 instructs the scanner unit 13 to scan an document. In response to this instruction, the scanner unit 13 starts scanning the document. The printer unit 14 is an image forming device for forming the image data received from the control unit 11 on a sheet of paper.

<In Regard to Control Unit>

Figure 12:
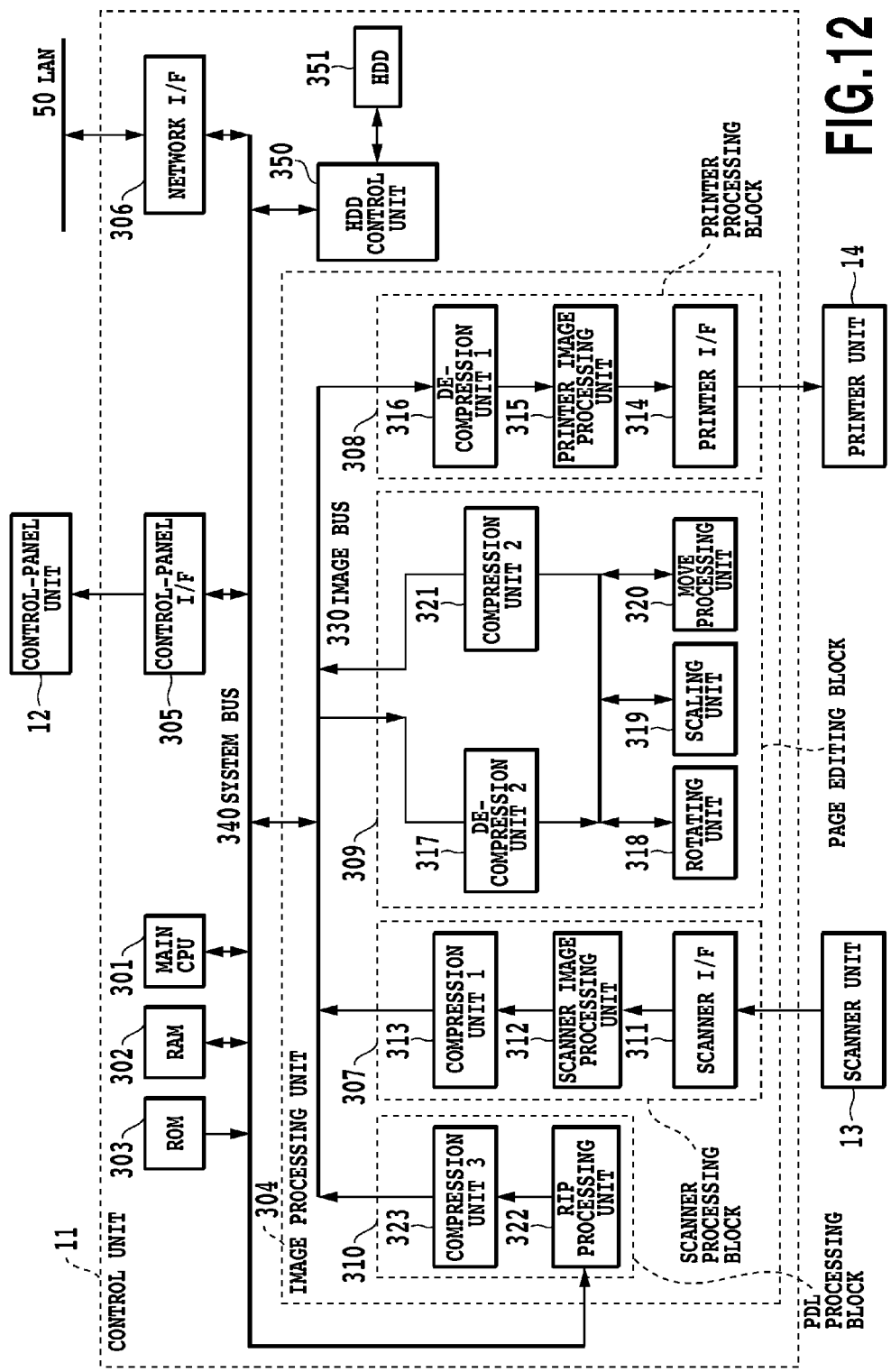
FIG. 12 is a diagram illustrating the configuration of a control unit 11 of the image forming apparatus 100 in the embodiment of the present invention.

FIG. 12 is a block diagram illustrating in more detail the configuration of the control unit 11 serving as the image processing device of the image forming apparatus 100 in the embodiment.

The control unit 11 is electrically connected to the scanner unit 13 and the printer unit 14, and also is connected to the PC 20, another image forming apparatus 200 and the like through the LAN 50. These connections enable input and output of image data and device information.

A main CPU 301 entirely controls access to various devices connected thereto on the basis of control programs stored in a ROM 303 or the like, and also entirely controls various processing executed in the control unit 11.

A RAM 302 is a system work memory for operating the main CPU 301 and serves as a memory for temporarily storing image data. The RAM 302 may comprise an SRAM which holds stored contents even after the power is turned off and a DRAM from which the stored contents are erased after the power is turned off.

Reference numeral 350 denotes an HDD control unit to which an HDD 351 is connected to allow for storage of various types of data such as document data, image data and system software. The main CPU 301 is configured to control the HDD control unit 350 and the HDD 351 through the system bus 340.

A control-panel I/F 305 is an interface unit for making a connection between the system bus 340 and the control-panel unit 12. The control-panel I/F 305 receives the image data to be displayed on the control-panel unit 12 from the system bus 340, and outputs it to the control-panel unit 12. The control-panel I/F 305 also outputs the information received from the control-panel unit 12 to the system bus 340. A network I/F 360 is connected to the LAN 50 and the system bus 340 to input/output information via the LAN 50.

<In Regard to Image Processing Unit>

Next, each processing performed in the image processing unit 304 will be described in detail with reference to FIG. 12. An image bus 330 is a transmission path for receiving/sending image data, and comprises a bus such as a PCI bus. The image processing unit 304 is roughly divided into blocks of a scanner processing block 307, a printer processing block 308, a page editing block 309, and a PDL processing block 310.

Next, the processing performed in the scanner processing block 307 will be described in detail. A scanner image processing unit 312 performs correction processing, manipulation processing and the like on the image data received from the scanner unit 13 through a scanner I/F 311. The scanner image processing unit 312 makes determinations whether the image data received is on a color document or a black-and-white document, on a text document or a photograph document, and the like, and then attaches the determination results to the image data. Such attendant information is referred to as image-region data. Details of the processing performed in the scanner image processing unit 312 will be described later. A compression unit 1 313, upon reception of the image data, encodes the image data by use of the block approximation encoding according to the embodiment, and then outputs the encoded image data to the image bus 330.

Figure 13:
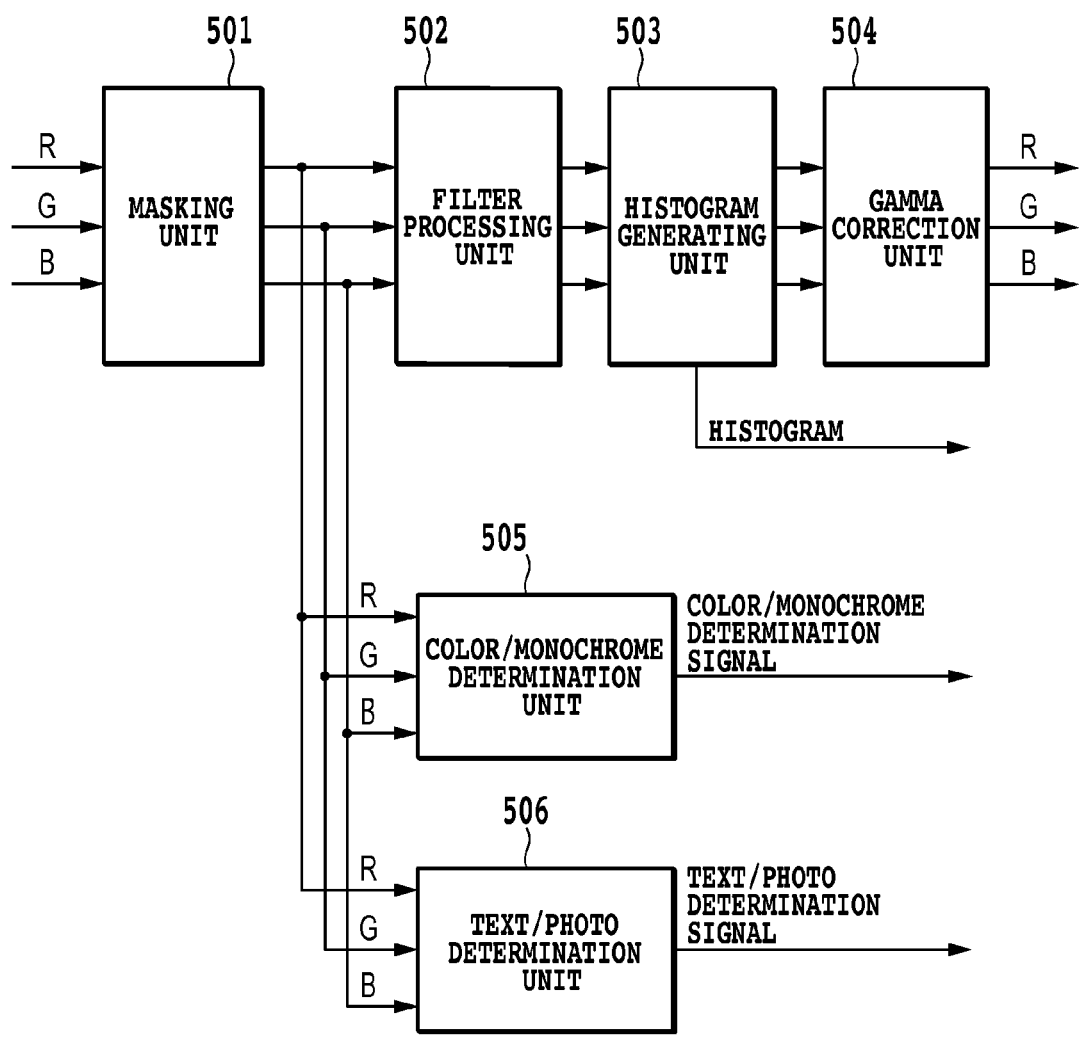
FIG. 13 is a diagram illustrating the processing contents of a scanner image processing unit 312 in the embodiment of the present invention.

FIG. 13 illustrates an internal configuration of the scanner image processing unit 312. The scanner image processing unit 312 receives the image data including three 8-bit RGB luminance signals each of which is then converted into a standard luminance signal independent of a filter color of the CCD by a masking unit 501. A filter processing unit 502 arbitrarily corrects the spatial frequency of the received image data. The filter processing unit 502 performs an operation using, for example, a 7×7 matrix on the received image data.

A histogram generating unit 503 samples luminance data on each of the pixels used to represent the received image data. More specifically, the luminance data in each rectangular region which is surrounded by starting points and end points respectively defined in the main scanning direction and the sub scanning direction is sampled at a fixed pitch in the main scanning direction and the sub scanning direction. Based on the result of the sampling, histogram data is generated. The histogram data thus generated is used to estimate a background level used in background removal processing which will be performed in a later stage.

A gamma correction unit 504 uses a look-up table or the like to convert the RGB luminance data input thereto into luminance data having non-linear characteristics. A color/monochrome determination unit 505 determines whether each of the pixels of the received image data is a chromatic color or an achromatic color. Then, the determination result is attached to the image data as a color/monochrome determination signal (part of the image-region data). A text/photo determination unit 506 determines whether each of the pixels of the image data is a pixel forming part to a character or a pixel forming part of a non-character (e.g. photograph or the like). The determination result is attached to the image data as a text/photo determination signal (part of the image-region data).

Next, the processing in the printer processing block 308 will be described in detail. The printer image processing unit 315 receives the compressed image data from the image bus 330. A decompression unit 1 316 decodes the compressed image data to produce image data which is then subjected to correction processing, manipulation processing and the like. The decompression unit 1 316 has a decoding unit for the block approximation encoding according to the embodiment, and a JPEG decoding unit, and is controlled by the main CPU 301 to selectively use the decompression processing in accordance with an operation mode of the image forming apparatus 100. The printer image processing unit 315 is configured to change its processing contents on the basis of the histogram, the color/monochrome determination signal and the text/photo determination signal generated in the scanner image processing unit.

Figure 14:
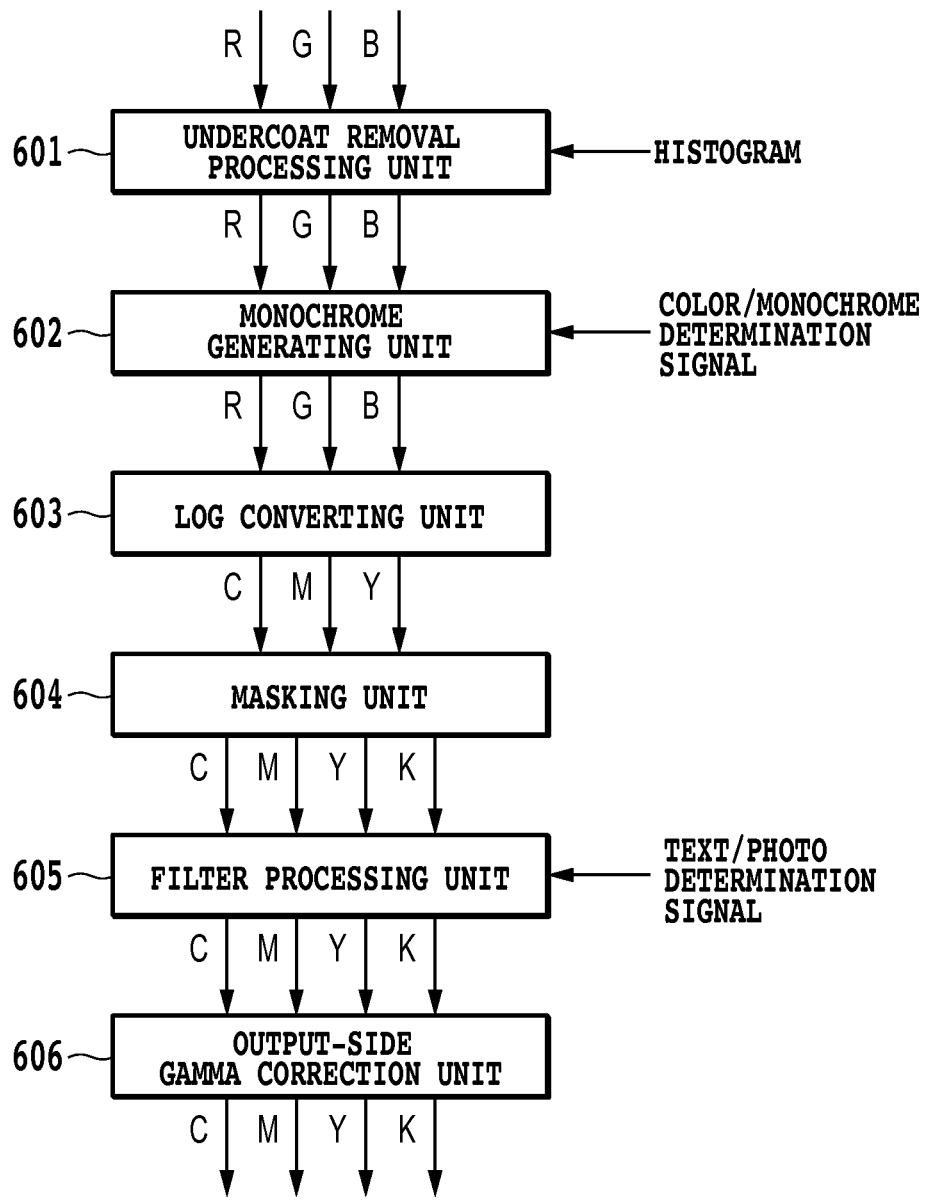
FIG. 14 is a diagram illustrating the processing contents of a printer image processing unit 315 in the embodiment of the present invention.

FIG. 14 shows the flow of the processing performed in the printer image processing 315. A background removal processing unit 601 uses the histogram generated by the scanner image processing unit 312 to convert all the RGB luminance signals determined as the background area into maximum luminance signals for removal of the background from the image data.

A monochrome generating unit 602, when the color/monochrome determination signal generated by the scanner image processing unit 312 is used to determine the input image data as a monochrome image, calculates a mean value of the RGB values in the respective pixels and then replaces each of the RGB values in the pixels for the mean value. Thus, K single-color print data will be generated through the processing performed by the masking unit in a later stage.

A LOG converting unit 603 uses a look-up table or the like to perform luminance intensity conversion from RGB to CMY. At this stage, if all CMY values in the CMY data are adjusted to be equal to each other by the aforementioned monochrome generating unit 602, K single-color data is produced, resultantly generating monochrome image data.

The masking unit 604 defines the minimum value of the CMY image data generated by the LOG converting unit 603 as a K data value for output, and then performs the processing of defining a value obtained by subtracting the K data value from the CMY value input thereto as a CMY data value for output.

A filter processing unit 605 arbitrarily corrects the spatial frequency of the received image data. The filter processing unit 605 performs an operation using, for example, a 7×7 matrix on the received image data.

An output-side gamma correction unit 606 performs the correction such that a signal value input to the output-side gamma correction unit 606 and a reflection density value of a copy output are proportional to each other.

As described above, the image data processed by the printer image processing 315 is sent to the printer unit 14 via the printer I/F 314 to produce a printout.

Next, the processing performed by the page editing block 309 will be described in detail. The compressed image data received from the image bus 330 is decoded by a decompression unit 2 317 to produce decoded image data which is then sent to various processing units as described below. The decompression unit 2 317 has a decoding unit for the block approximation encoding according to the embodiment, and a JPEG decoding unit, and is controlled by the main CPU 301 to selectively use the decompression processing in accordance with an operation mode of the image forming apparatus 100.

A rotating unit 318 rotates each page in the input image data by 90 degrees, 180 degrees and 270 degrees to produce output data. Using a complement algorithm, a thinning-out algorithm or the like, a scaling unit 319 enlarges or reduces the size of the image data to produce output data. A move processing unit 320 moves a printing position on a page data-by-page data basis for printing the image data which have been processed by the rotating unit 318 and/or the scaling unit 319. As a result, the processing of merging a plurality of pages into a single page such as 2-in-1 printing or 4-in-1 printing, the processing of dividing the enlarged image page of one page into four pages for printing, and the like are implemented.

A compression unit 2 321 includes an encoding unit for the block approximation encoding according to the embodiment, and a JPEG encoding unit, and is controlled by the main CPU 301 to selectively use the decompression processing for each operation mode.

<In Regard to PDL Print Operation>

Next, the processing relating to the PDL processing block 310 and PDL print operation will be described in detail. PDL data sent from an external PC or the like via the LAN 50 is sent to the RAM 302 through the network I/F 306 and stored in the RAM 302. The PDL data is read and analyzed by the main CPU 301, with the result that intermediate data is generated and then sent to a RIP processing unit 322. The RIP processing unit 322 renders the intermediate data to produce raster image data. The raster image data thus produced is sent to a compression unit 3 323 for block approximation encoding compression processing according to the embodiment.

The image data which has been compressed by the compression unit 3 323 is output to the image bus 330, and then sent to HDD 351 via the system bus 340. For printing out, the data stored in the HDD 351 is read and captured into the printer processing block 308 through the system bus 340 and the image bus 330. The captured data is subjected to predetermined processing in the printer processing block 308, and then is sent to the printer unit 14 to form an image on a print paper. At this stage, for the decompression processing performed by the decompression unit 1 316 in the printer processing block 308, the main CPU 301 controls the printer processing block 308 to perform the decoding processing for the block approximation encoding.

Delivering image data by way of a hard disk is based on the assumption of the case of printing out a plurality of sets of a plurality of pages of the image data. The image data for printout stored in the HDD 351 may be data encoded by use of the block approximation encoding with a low compression ratio, because the image data is deleted at the time the printout operation is terminated.

<In Regard to Copy Operation>

Next, details of copy operation will be described. An document read by the scanner unit 13 is sent as image data to the scanner image processing unit 312 through the scanner I/F 311. The scanner image processing unit 312 performs the processing shown in FIG. 13 on the image data.

Subsequently, the compression unit 1 313 performs the block approximation encoding compression processing on the image data. The image data thus compressed by the compression unit 1 313 is sent to and stored in the HDD 351 through the image bus 330 and the system bus 340. Note that, as necessary, the image data is sent to the page editing block 309 for image processing, and then sent to the HDD 351.

In the copy operation, in the case of sending the image data through the page editing block 309, data which has been compressed by being subjected to the block approximation encoding compression is sent to and stored in the HDD 351. Then, the data read from the HDD 351 is sent from the system bus 340 through the image bus 330 to the printer processing block 308.

The decompression unit 1 316 in the printer processing block 308 decodes the image data. At this stage, in the data decompression processing, the processing of the block approximation encoding is to be performed. The printer image processing unit 315 performs the processing shown in FIG. 14 on the image data. The image data processed by the printer image processing unit 315 is sent to the printer unit 14 through the printer I/F 314.

Delivering image data by way of a hard disk is based on the assumption of the case of printing out a plurality of sets of a plurality of pages of the image data. The image data for printout stored in the HDD 351 may be data encoded by use of the block approximation encoding with a low compression ratio, because the image data is deleted at the time when the printout operation is terminated.

<In Regard to Storage of Scanned Data in HDD>

Next, the operation of storing scanned image data in the HDD 351 will be described in detail. An document scanned by the scanner unit 13 is sent as image data to the scanner image processing unit 312 through the scanner I/F 311. The scanner image processing unit 312 performs the processing shown in FIG. 13 on the image data.

Subsequently, the compression unit 1 313 performs the block approximation encoding compression processing on the image data. The image data thus compressed by the compression unit 1 313 is required to be compressed with a high compression ratio by JPEG, because the image data is stored in the HDD. For this reason, the image data is sent to the page editing block 309 via the image bus 330. The image data is, as necessary, processed in the page editing block 309, then is compressed by the JPEG compression processing, and then is sent to and stored in the RAM 302. Then, the data read from the RAM 302 is given a file name and/or the like on the basis of user setting, and is then written into a predetermined directory on the HDD 351.

<In Regard to Printout of Data Stored in HDD>

Next, the operation when the data stored in the HDD 351 is printed out will be described in detail. By the control of the main CPU 301, the data stored in the HDD 351 is read from the HDD 351 and is input via the system bus 340 to the printer processing block 308 in the image processing unit 304.

The decompression unit 316 in the printer processing block 308 decodes the image data. At this stage, since the data stored in the HDD 351 has been compressed by JPEG, processing for JPEG decoding is performed in the data decompression processing. The printer image processing unit 315 performs the processing shown in FIG. 14 on the image data. The image data which has been processed in the printer image processing unit 315 is sent to the printer unit 14 through the printer I/F 314.

<Features of Block Approximation Encoding Compression Processing in the Embodiment>

FIG. 1 is a block diagram illustrating block approximation encoding compression processing according to the embodiment.

In the block approximation encoding compression processing according to the embodiment, two types of compression processing (first compression and second compression) are performed in parallel, so that two kinds of compression result data can be obtained. The block approximation encoding compression processing is characterized by selecting, as compression processed data, one of the two types of processing results (compression result data) which leads to a smaller difference among two differences by comparison between the original image data and each of the decoding result data which are obtained by decoding the respective compression result data.

In the embodiment, with consideration of a reduction in time period required for the processing, two types of compression processing (two-color-form compression processing and color holding compression processing) are preferably performed in parallel, or alternatively may be performed by providing a time lag therebetween. Importance in the embodiment is that the compression result data and the decoding result data are prepared in a stage before difference comparison processing which will be described later. As a result, the two types of compression processing can be performed in parallel or by providing a time lag therebetween.

In the specification, the "compression result data" refers to compressed data produced through two-color-form compression processing or color holding compression processing which will be described later. Also, the "decoding result data" refers to data produced by decoding the compression result data.

One (first compression) of the two types of compression processing is performed for the purpose of reducing the amount of data through the following processes. Specifically, image data is divided into blocks each containing a plurality of pixels, that is, into M×N pixel blocks (where M and N are each an integer of 1 or more, and at least one of M and N is an integer of 2 or more). Then, the number of colors existing in each block is defined as two, and configuration information (also called "pattern information") on the arrangement of the two colors is obtained. Then, the pattern information thus obtained and color information on each of the two colors are respectively stored as compression result data. This compression method is hereinafter referred to as "two-color-form compression processing" in the specification.

The other (second compression) of the two types of encoding (compression processing) is performed for reducing the amount of data by reducing the number of gradations by a predetermined percentage, for example, 50 percent, without a change in the number of colors in each block containing the plurality of pixels. This compression method is hereinafter referred to as "color holding compression processing" in the specification.

In an example described below, a block containing a plurality of pixels is assumed to be a 2×2 pixel block (one area of 2×2 pixels). Accordingly, in the color holding compression processing, processing is performed such that the number of colors in a 2×2 pixel block, which are colors of the four pixels contained in the block, that is, four colors, is not changed, but the number of gradations is reduced by 50 percent. In the specification this processing is particularly called "four-color holding compression processing".

<Detailed Description of Encoding Process in Two-Color-Form Compression Processing>

Next, an encoding process in the two-color-form compression processing will be described in detail. In the encoding in the two-color-form compression processing, the compression unit 1 313, the compression unit 2 321 and the compression unit 3 323 (hereinafter referred to simply as "compression unit" for the sake of simplifying the description) perform the following process.

Step 1: The colors of the respective four pixels in the 2×2 pixel block are divided into two groups of colors with small color differences. When the number of colors of the four pixels is two, each of the two colors is assigned to each of the two groups.

Step 2: A configuration pattern created when the colors are divided into the groups is defined as 3-bit pattern information.

Step 3: The colors in each group are averaged and defined as color A and color B. When the number of colors of the four pixels is two, each of the colors A and B is each of the two colors of the four pixels.

Step 4: The color information on the two colors, color A and color B, and the pattern information are output as two-color-form compression processed data (first compression result data). The information thus output is stored in the HDD 351.

Figure 2:
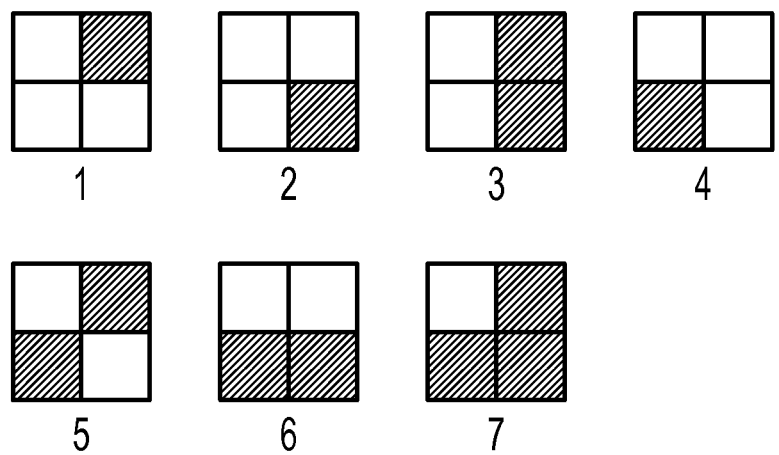
FIG. 2 is a diagram depicting pattern information in two-color-form compression processing in the embodiment of the present invention.
Figure 2:
Figure 2:

Next, each processing described above will be described in detail with reference the drawings. FIG. 2 depicts the pattern information produced when the colors of the respective four pixels of a 2×2 matrix are divided into two groups of colors with small color differences. In the embodiment, possible configurations of a 2×2 pixel block processed to the two-color form are respectively assigned to the pattern information items (information on patterns "1" to "7" in FIG. 2). In FIG. 2, the configuration in which all the four pixels have the same color (in this case, the pattern information is "zero") is not assigned to the pattern information relating to the two-color form, but assigned when the four-color holding compression processing which will be described later is performed. As a result, the decompression unit, which will be described later, can be recognize whether the compression processing is the two-color-form compression processing (in which the pattern information corresponds to the information on any pattern "1" to "7") or the four-color holding compression processing (in which the pattern information corresponds to pattern "zero") by analyzing the pattern information.

Figure 3:
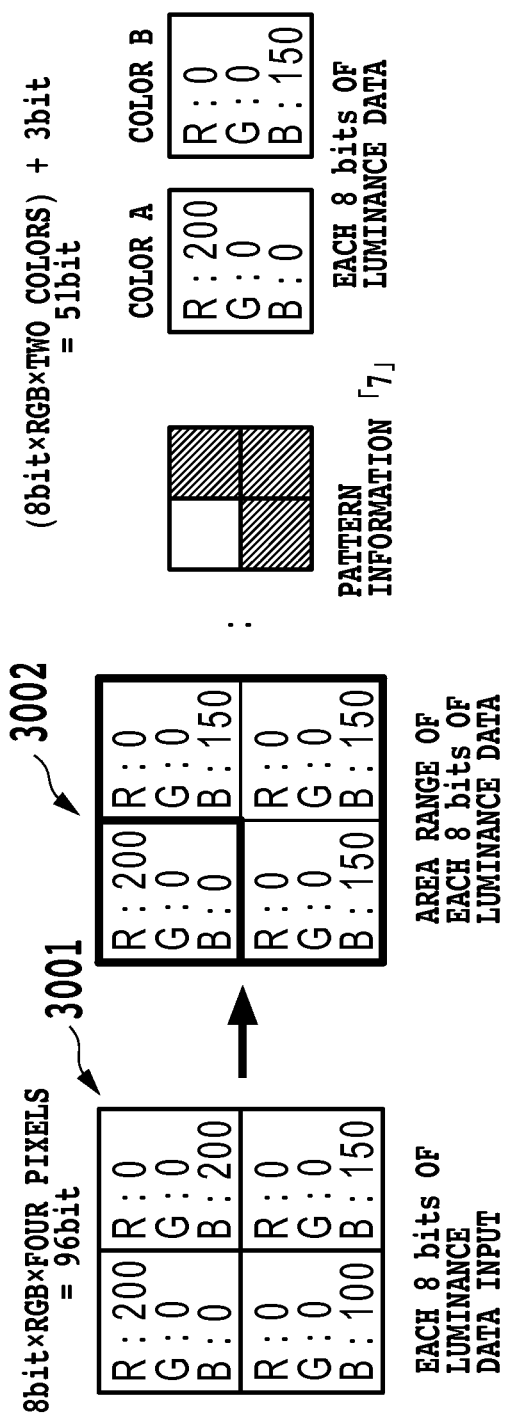
FIG. 3 is a diagram depicting a processing example at encoding in the two-color-form compression processing in the embodiment of the present invention.

When the image data is divided into areas of a 2×2 matrix (2×2 pixel blocks), if data as indicated by reference numeral 3001 in FIG. 3 results, it means that the area is separated between one upper left pixel and three pixels except the one upper left pixel. As a result, in this case, the patter information indicates pattern "7" (corresponding to the information on pattern "7" in FIG. 2).

RGB data on each of the colors A and B is calculated as follows. When the input RGB image data is divided into 2×2 areas, if a state as indicated by reference numeral 3002 in FIG. 3 occurs, the color A is a value of the upper left pixel and the color B is a mean value of the three pixels except the upper left pixel. Thus, the colors A and B have respectively RGB values as shown in the colors A and B in FIG. 3.

As two-color-form compression processed data (compression result data), data of 51 bits in total is output, in which 3 bits are for the aforementioned pattern information, 24 bits are for 8-bit R data, 8-bit G data and 8-bit B data on the color A and 24 bits are for 8-bit R data, 8-bit G data and 8-bit B data on the color B.

In the embodiment, as described above, in the case of dividing the image data into 2×2 areas, when exactly the same data as the case of the four pixels is input, the pattern zero, that is, the pattern in which the 2×2 area is not divided, is used fundamentally.

Figure 4:
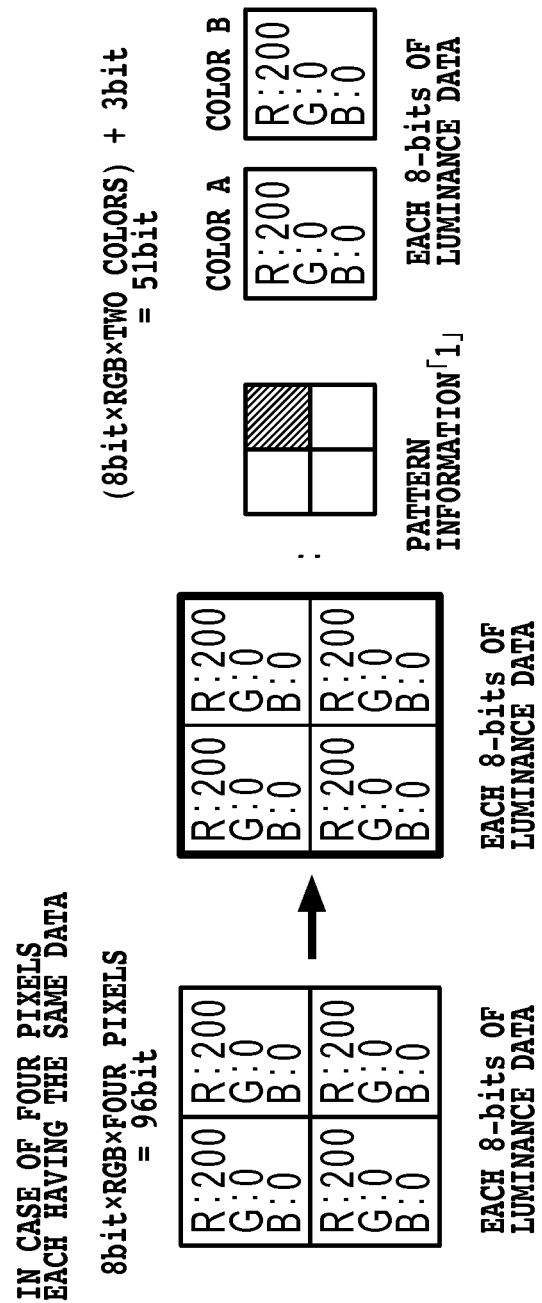
FIG. 4 is a diagram depicting a processing example at encoding in the two-color-form compression processing in the embodiment of the present invention.

In the embodiment, however, on the assumption that equivalent decoding result is obtained in the decoding process, pattern information as depicted in FIG. 4 is defined as "1", and data on RBG showing the same value in the colors A and B is output as the two-color-form compression processed data.

<Details of Decoding Process in Two-Color-Form Compression Processing>

Next, decoding in the two-color-form compression processing will be described in detail. In the decoding in the two-color-form compression processing, the decompression unit 1 316 and the decompression unit 2 317 (hereinafter referred to simply as "decompression unit" for the sake of simplifying the description) are configured to perform the following process.

Step a: The 51-bit data including 3-bit pattern information and three 8-bit color information items on each of the colors A and B (compression result data) is input.

Step b: The ranges for the colors A and B are determined on the basis of the 3-bit pattern information.

Step c: Based on the pattern information, two sets of 24-bit data on the respective colors A and B are assigned to the regions for the colors A and B. That is, while accessing the pattern information, the locations of the color A and the color B in the 2×2 area of interest are rearranged.

Step d: the data including three 8-bit RGB data items in each of the four pixels (96 bits in total) is output as two-color-form compression processing decoded data (decoding result data).

Figure 5:
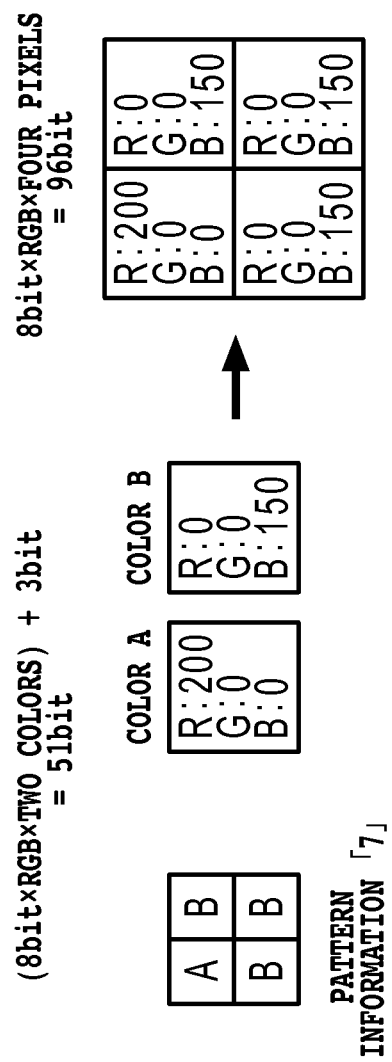
FIG. 5 is a diagram depicting a processing example at decoding in the two-color-form compression processing in the embodiment of the present invention.

Next, the processing in each of the steps a to d will be described in detail based on FIG. 5. As illustrated in FIG. 5, when the decompression unit receives 51 bits in total of pattern information, color information on the color A and color information on the color B (step a), the decompression unit recognizes that the data has been subjected to the two-color-form compression processing as long as the pattern information corresponds to any of patterns "1" to "7" (step b).

Next, the decompression unit determines from the pattern information which range the color A or the color B should be assigned to, and assigns the data on the color A and the data on the color B to the corresponding regions (step c). Thereupon, the RGB data of the four pixels as illustrated in the right-hand portion of FIG. 5 are decoded. Thus, the decompression unit obtains the two-color-form compression processing decoded data (decoding result data) (step d).

Figure 6:
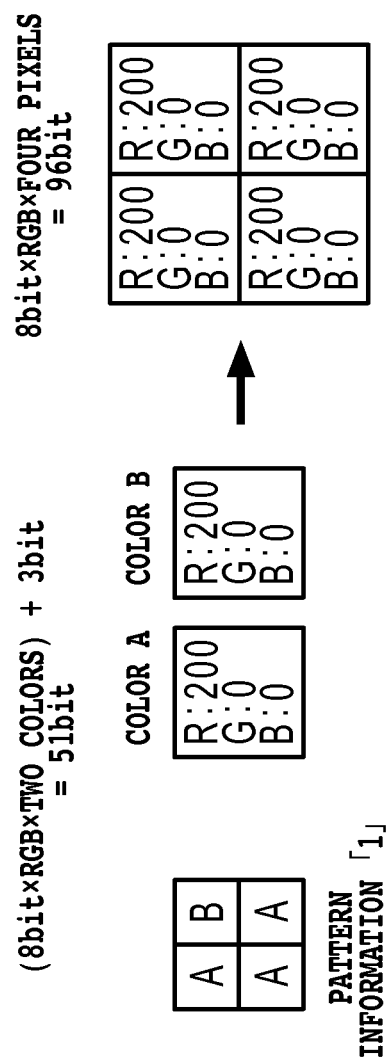
FIG. 6 is a diagram depicting a processing example at decoding in the two-color-form compression processing in the embodiment of the present invention.

In the case of receiving two-color-form compression processed data as illustrated in FIG. 6, the colors A and B have the same value. Accordingly, when the color A and the color B are assigned to the regions in which the pattern information indicates pattern "1", the same data is decoded for the four colors.

<Details of Encoding Process in Four-Color Holding Compression Processing>

Next, encoding in the four-color holding compression processing will be described in detail. For encoding in the four-color holding compression processing, the compression unit receives 96-bit data containing three 8-bit RGB data items in a 2×2 pixel block. The compression unit reduces the number of bits of the data representing the number of graduations for each color component with keeping the number of colors of the four pixels at four in order to reduce the number of data.

Figure 7:
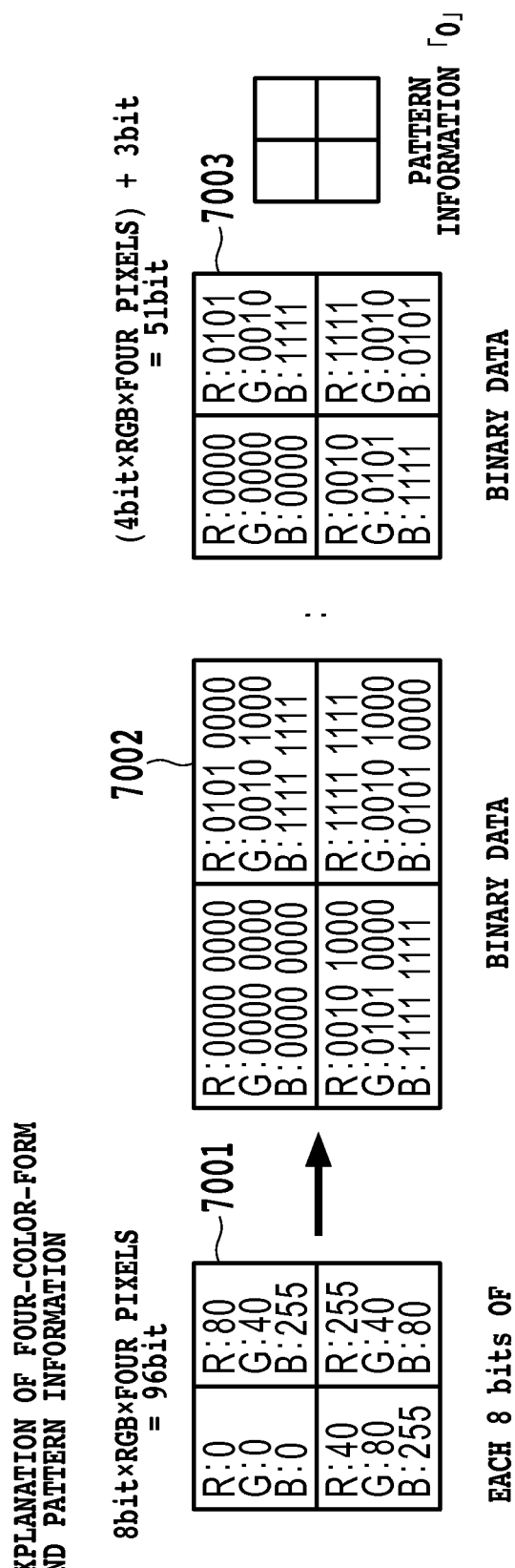
FIG. 7 is a diagram depicting a processing example at encoding in four-color holding compression processing in the embodiment of the present invention.
Figure 8:
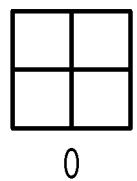
FIG. 8 is a diagram depicting pattern information in the four-color holding compression processing in the embodiment of the present invention.

That is, when three 8-bit data items on RGB in a 2×2 matrix as indicated by reference numeral 7001 in FIG. 7 are input, the data is converted into binary data as indicated by reference numeral 7002 in FIG. 7. Predetermined low-order bits are discarded from the 8-bit data on each of RGB in each pixel (in this case, the four low-order bits, which are the lower half part of all the 8 bits), resulting in three 4-bit RGB data items in each of the four pixels in the 2×2 pixel block, as indicated by reference numeral 7003 in FIG. 7. The pattern information in the four-color holding compression processing is set to the information indicating pattern "zero" as shown in FIG. 8 for the purpose of showing that the four-color holding compression processing has been performed.

As data after the four-color holding compression processing in the embodiment (second compression result data), data of 51 bits in total is output, in which 3 bits are for the aforementioned pattern information, and 48 bits are for three 4-bit RGB data items in each of the four pixels. Accordingly, the amount of information in this case is the same as that of the compression result of the two-color-form compression processing described earlier.

<Details of Decoding Process in Four-Color-Holding Compression Processing>

Next, decoding in the four-color holding compression processing will be described in detail. When 56 bits in total of the pattern information and data relating to color A and color B are input and the pattern information indicates pattern "zero" as illustrated in FIG. 9, the decompression unit recognizes that the data has been subjected to the four-color holding compression processing.

Figure 9:
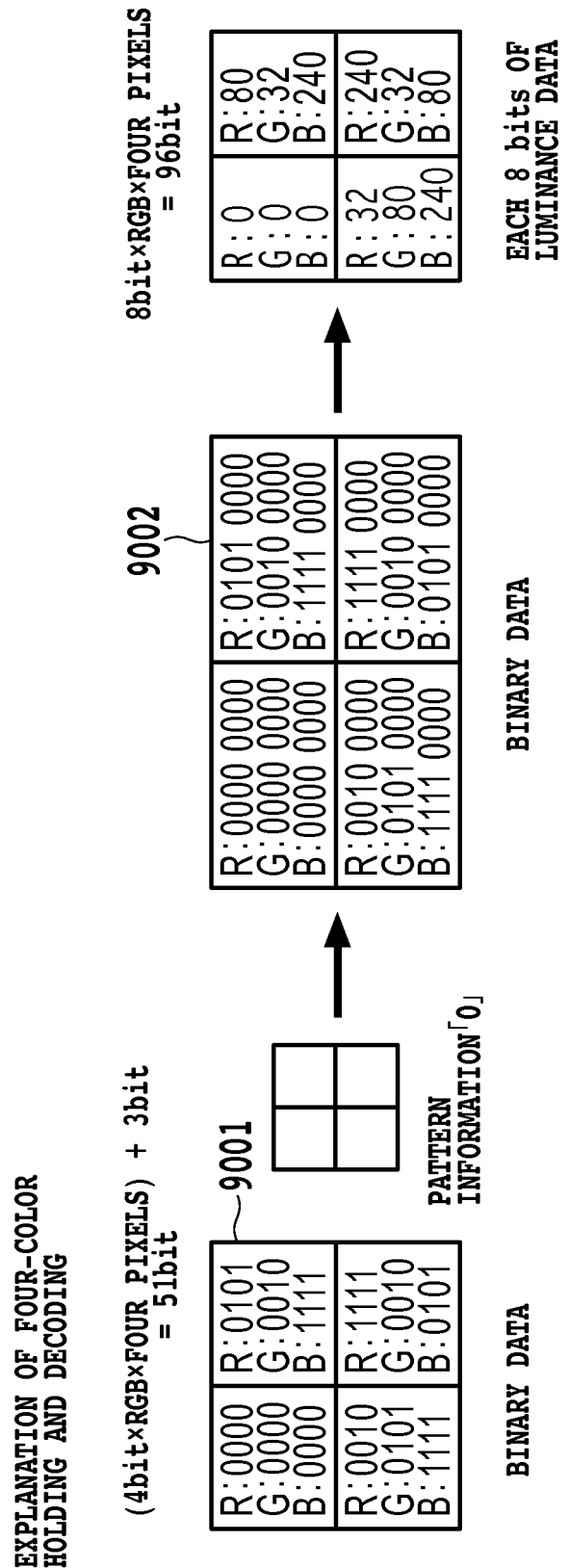
FIG. 9 is a diagram depicting a processing example at decoding in the four-color holding compression processing in the embodiment of the present invention.

Assuming that the decompression unit divides the 51-bit compressed data (compression result data) input to the decompression unit into two, 3-bit pattern information and four 4-bit colors in each pixel, for recognition, and the binary data in each of the 2×2 pixels have values as indicated by reference numeral 9001 in FIG. 9.

Then, the decompression unit adds "zero" of 4 bits (corresponding to the number of bits which have been discarded in the earlier stage) to the low-order 4 bits of the data in each of the 2×2 pixels. In this manner, the decoding to 8-bit data as indicated by reference numeral 9002 in FIG. 9 is accomplished, and 8-bit RGB image data in 2×2 pixels as indicated by reference numeral 9003 in FIG. 9 is decoded.

<Details of Block Approximation Encoding Compression Processing in the Embodiment>

In the block approximation encoding compression processing in the embodiment, the compression unit performs two types of compression processing, the two-color-form compression processing and the four-color holding compression processing, in parallel as illustrated in FIG. 1.

As shown in FIG. 1, the main CPU 301 decodes two sets of encoded data respectively obtained by the two-color-form compression processing and the four-color holding compression processing (two-color-form compression processing data; compression result data) to reconstruct the original image data. This reconstructed original image data is the two-color-form compression processing decoded data and the four-color holding compression decoded data (generally, decoding result data). Then, for each of the 2×2 pixel blocks, a difference between each of the two sets of reconstructed original image data (decoding result data) and the original image data is calculated.

This calculation of the difference is performed as follows. Assuming that the sums of RGB data of the four (2×2) pixels in the original image data before being encoded are respectively R1, G1 and B1, and likewise, the sums of RGB data of the four (2×2) pixels when the encoded data is decoded by the two-color-form decoding are respectively R2, G2 and B2. In the two-color-form compression difference detection, the main CPU 301 calculate the absolute value sums of R1-R2 absolute values, G1-G2 absolute values and B1-B2 absolute values in each 2×2 pixel block. The data thus obtained is referred to as two-color-form compression difference data. The main CPU 301 calculates such two-color-form compression difference data on a block-by-block basis.

Likewise, assuming that the sums of RGB data of the four (2×2) pixels in the original image data before being encoded are respectively R1, G1 and B1, and the sums of RGB data of the four (2×2) pixels when the encoded data is decoded by the four-color holding decoding are respectively R3, G3 and B3.

In the four-color holding compression difference detection, the main CPU 301 calculate the absolute value sums of R1-R3 absolute values, G1-G3 absolute values and B1-B3 absolute values in each 2×2 pixel block. The data thus obtained is referred to as four-color holding compression difference data. The main CPU 301 calculates such four-color holding compression difference data on a block-by-block basis.

In difference comparison and selection processing, the main CPU 301 inputs the two-color-form compression processing data, the four-color holding compression processing data, the two-color-form compression difference data and the four-color holding compression difference data which have been obtained as described above. Then, for predetermined blocks in the original image data, the main CPU 301 compares the values of the two-color-form data in the blocks. Then, the main CPU 301 outputs, as compressed output data, one of the two sets of compression processed data which has been compressed by the compression processing leading to a smaller value difference. The main CPU 301 performs this processing on all the 2×2 pixel blocks provided in the original image data.

Carrying out the processing as described above makes it possible to prevent or reduce the image degradation of a gradation image entered from a device such as a scanner, the gradation image suffering remarkable degradation in the two-color-form compression processing. In the embodiment, when the original image data is divided into plural-pixel blocks and then compressed, the two-color-form compression processing which makes the amount of data remain unchanged even after compression processing and also minimizes image degradation, and the four-color holding compression processing which easily keeps the gradations are performed to obtain two types of compression result data. For obtaining the compressed output data which is a compression processing result, a difference of the gradation value between one of the two types of compression result data and the original image data is compared on a block-by-block basis with a difference of the gradation value between the other type and the original image data. Then, based on the results of comparisons made in each block, the compression processing result which produces a smaller difference in the gradation value from the original image data is selected as the output data. Thus, it is possible to apply the compression processing causing color quality degradation by compression to be lower in each of the blocks in various conditions. Accordingly, it is possible to carry out most suitable compression processing in each of the blocks of the original image data, thus achieving compression with reduced image degradation.

In the embodiment, as the information indicating the result of performing the four-color holding compression processing, the pattern information indicating pattern "zero" is used. For the compression data when the same data is input for the four colors, the same value is given to the color A and the color B and the pattern information indicating patter "1" is used. That is, the pattern information indicating any one of patterns possibly produced in the used blocks is defined as information indicating the result of performing the four-color holding compression processing. This makes it possible to achieve a reduction in the amount of compressed data by eliminate the necessity of additionally loading information (1 bit) for distinguishing between the result of the two-color-form compression processing and the result of the four-color holding compression processing in the decoding process.

In addition, in the embodiment, even when either the two-color-form compression processing or the four-color holding compression processing is selected, since the sizes of data output are the same, the amount of compressed data is a fixed length, which is an advantage of the two-color-form compression processing. In consequence, random access to images is made possible.

Second Embodiment

It is generally known that, when data compressed by JPEG compression processing is decoded, image degradation tends to take place in an edge portion of a letter, a line or the like. The stronger the edge component such as of a letter or a line, the more remarkable the degradation of the image when the data is decoded becomes. In the two-color-form compression processing carried out in the detailed description of the first embodiment, since the number of colors used is reduced in each area (block) for data compression, there occurs the processing of being more likely to visually emphasize the edge components in the decoded image. As a result, the image data subjected to the two-color-form compression processing (compression result data) is decoded. Then, for the image with visually emphasized edge components, the compression data further subjected to the JPEG compression processing is decoded. In this case, the degradation of the image of a letter or a line becomes more remarkable.

To overcome this, in the embodiment, in the block approximation encoding compression processing, the edge information in the original image data is used to execute control such as for inescapably performing the four-color holding compression processing on an area (block) including the edge components. This control can prevent or reduce the quality degradation of a letter image after having been compressed and expanded by the JPEG processing in a later stage.

The image compression processing according to the embodiment will be described below with reference to the drawings. An image forming apparatus used in the embodiment is identical in structure and operation with the image forming apparatus 100 described in detail in the first embodiment, and the detailed description is omitted.

The following is a detailed description of the embodiment relating to block approximation encoding compression processing used in the control unit 11.

Figure 15:
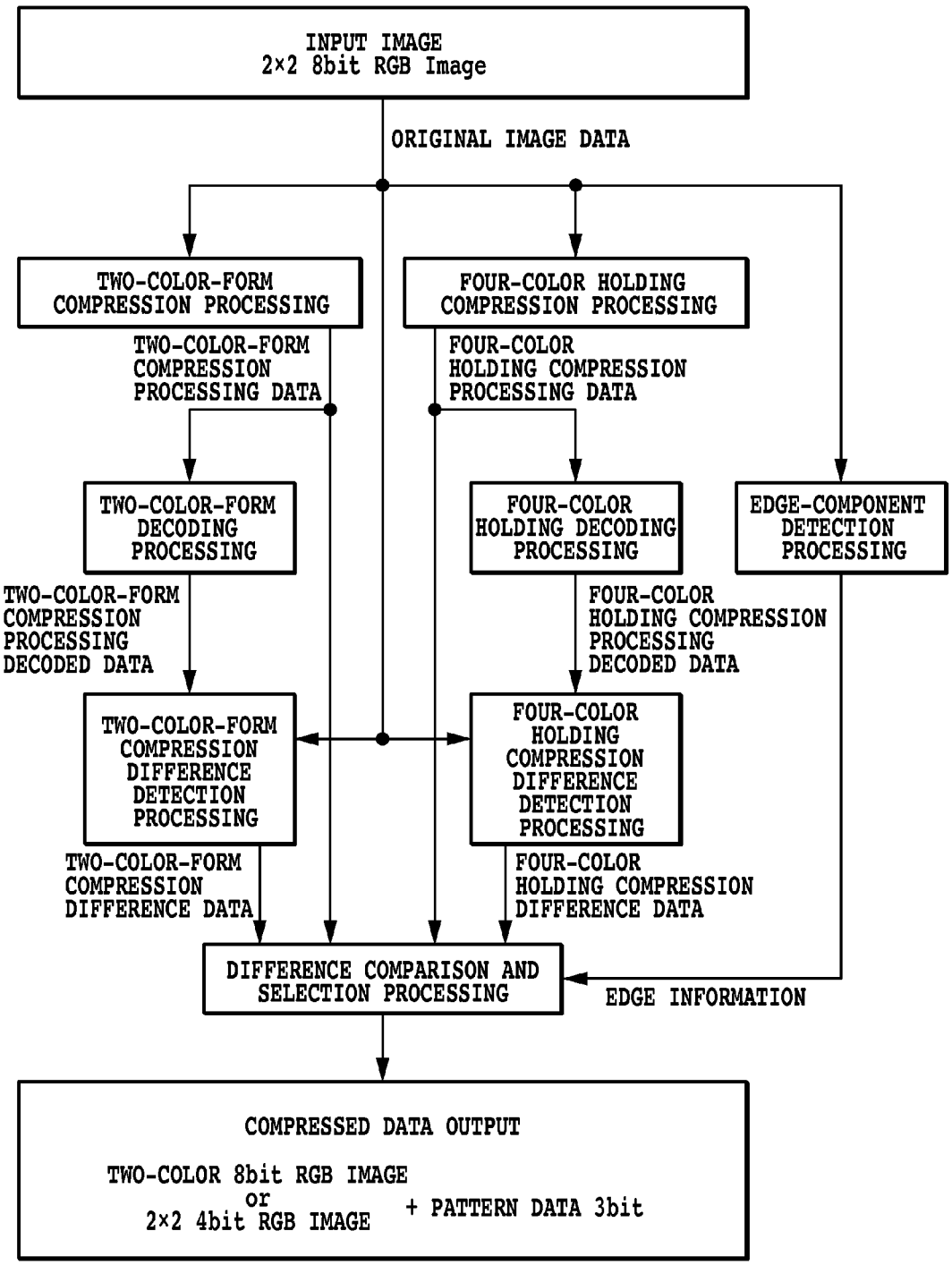
FIG. 15 is a diagram illustrating block approximation encoding compression processing according to the embodiment of the present invention.

FIG. 15 is a block diagram illustrating the block approximation encoding compression processing according to the embodiment. In the block approximation encoding compression processing in the embodiment, as in the case of the first embodiment, the two types of compression processing, that is, the two-color-form compression processing and the four-color holing compression processing are performed in parallel or with a time lag therebetween. The processing result of either one of the two is selected as output data after the compression processing.

The second embodiment is characterized by operating the main CPU 301 to produce edge information through edge-component detection processing and performing difference comparison and selection processing on an area (block) including an edge portion to forcibly determine the result of the four-color holding compression processing as output data.

Assuming, in the block approximation encoding compression processing in the embodiment, that the two types of compression processing, that is, the two-color-form compression processing and the four-color holing compression processing are performed in parallel, as illustrated in FIG. 15. The encoding and decoding processes in the two-color-form compression processing and the encoding and decoding processes in the four-color holding compression processing are similar to those described in detail in the first embodiment, and the detailed description is omitted.

As shown in FIG. 15, as difference comparison processing, the main CPU 301 calculates a difference between the original image data and the result of decoding each of the two encoding data (compression result data). This difference calculation is done by similar processing to that in the first embodiment, and the detailed description here is omitted.

In the second embodiment, the main CPU 301 produces edge information from the original image data through the edge component detection processing, in addition to the aforementioned two types of compression processing and the calculation of difference data.

Figure 16:
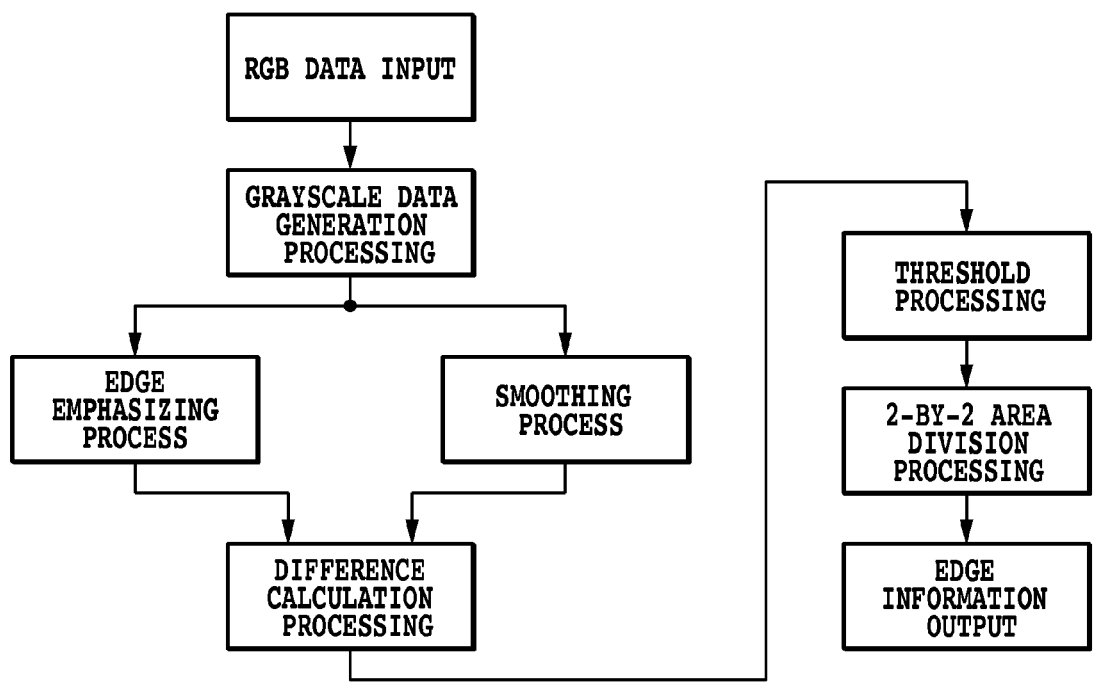
FIG. 16 is a diagram illustrating the contents of edge-component detection processing according to the embodiment of the present invention.

Details of the processes in the edge component detection processing are described with reference to FIG. 16. In grayscale data generation processing the main CPU 301 calculates a mean value of the RGB data (original image data) input thereto for conversion of grayscale data. Then, the main CPU 301 performs, on the one hand, an edge emphasizing process, and on the other hand, a smoothing process on the grayscale data. In the edge emphasizing process and the smoothing process in this stage, operation processing using, for example a 7×7 matrix is performed. In the difference calculation processing, the main CPU 301 calculates an absolute value of the difference in the edge emphasizing process and the smoothing process on a pixel-by-pixel basis.

Then, the main CPU 301 recognizes an area where the aforementioned difference exceeds a certain setting value (threshold) as an edge portion through threshold processing. In 2×2 area division processing, the main CPU 301 divides the image data on the edge information into 2×2 areas (2×2 pixel blocks) such that the 2×2 areas (2×2 pixel blocks) correspond with the areas (blocks) provided in the two-color—form compression processing and the four-color holding compression processing. If there are pixels or even a pixel recognized as an edge in each of the 2×2 areas, the area is determined as a portion including an edge, and the edge information is output for each 2×2 area. In this manner, the main CPU 301 extracts the edge component from each area (block).

In the difference comparison and selection processing, the main CPU 301 inputs the two-color-form compression processing data, the four-color holding compression processing data, the two-color-form compression difference data, the four-color holding compression difference data and the edge information. Then, the main CPU 301 recognizes edge information for each 2×2 area. For the areas without an edge, as in the case of the first embodiment, the main CPU 301 compares a difference between the two-color-form compression difference data and the four-color holding compression difference data, and then outputs, as the compressed output data, processing data which has been compressed by the compression processing which leads to a smaller difference.

For the areas including the edges, regardless of the values of the difference data, the main CPU 301 forcibly outputs, as the compressed output data, the processing data which has been compressed by the four-color holding compression processing.

Carrying out the processing as described above makes it possible to prevent the image degradation of a gradation image entered from a device such as a scanner, the gradation image suffering remarkable degradation in the two-color-form compression processing.

In the embodiment, the process of detecting an edge component is performed on each of the plural-pixel blocks into which the original image data is divided. For the blocks in which the edge is detected, the compression result data, which is obtained by forcibly performing the four-color holding compression processing, is determined as compressed output data. Accordingly, it is possible to prevent or reduce the image degradation occurring on a text or line image when decoding is performed on the image data which has bee subjected to at least the two-color-form compression processing, and on the compression data obtained by further performing the JPEG compression processing on an image with an emphasized edge component.

Third Embodiment

In the second embodiment, when the JPRG compression processing is further performed on the decoding result data which is produced when an edge component is included in the original image data, the control is performed such that the four-color holding compression processing is performed on a block in which the edge exists in order to reduce the degradation occurring particularly on the image with the edge component. That is, by way of example, a description has been given of the case of switching the difference comparison and selection processing on the basis of the edge information for the purpose of reducing the image degradation occurring on a letter of a line when decoding is performed on the compression data obtained by further performing the JPEG compression processing on the image with an emphasized edge component (the two-color-form compression decoding data).

However, in the image forming apparatus 100, depending on the operation mode, any one of the following two operation modes may be possibly be selected for an image subjected to the block approximation encoding compression processing. A first mode is the operation mode (mode A) of not performing the compression and decompression processing by JPEG processing after the image processing has been performed. A second mode is the operation mode (mode B) of performing the compression and decompression processing by JPEG processing.

In the case of mode A, since the JPEG processing does not cause image degradation to occur in the edge portion in a later stage, the processing leading to a smaller difference from the original image data is selected. It is possible to minimize the degradation occurring relative to the original image. In the case of mode B, since there is a possibility that the JPEG compression and decompression processing performed in a later stage causes an edge portion to suffer image degradation, the processing result of the four-color holding compression processing is forcibly selected for the edge portion, thus achieving a reduction in quality degradation in text image.

In consequence, in the embodiment, characteristically, the main CPU 301 recognizes in which mode the image forming apparatus 100 is, and determines whether or not the JPEG compression processing is performed after the block approximation encoding compression processing. When the JPEG compression processing is not performed in a later stage, a processing result leading to a small difference, which is determined from the result of difference comparison between the two-color-form compression difference data and the four-color holding compression difference data, is selected as output data. When the JPEG processing is performed in a later stage, the compression data, which is obtained by the four-color holding compression processing, is forcibly selected for the edge portion as output data.

The image compression processing according to the third embodiment will be described below with reference to the drawings. An image forming apparatus used in the embodiment is identical in structure and operation with the image forming apparatus 100 described in detail in the first embodiment, and the detailed description is omitted. The following is a detailed description of the third embodiment relating to block approximation encoding compression processing used in the control unit 11.

Figure 17:
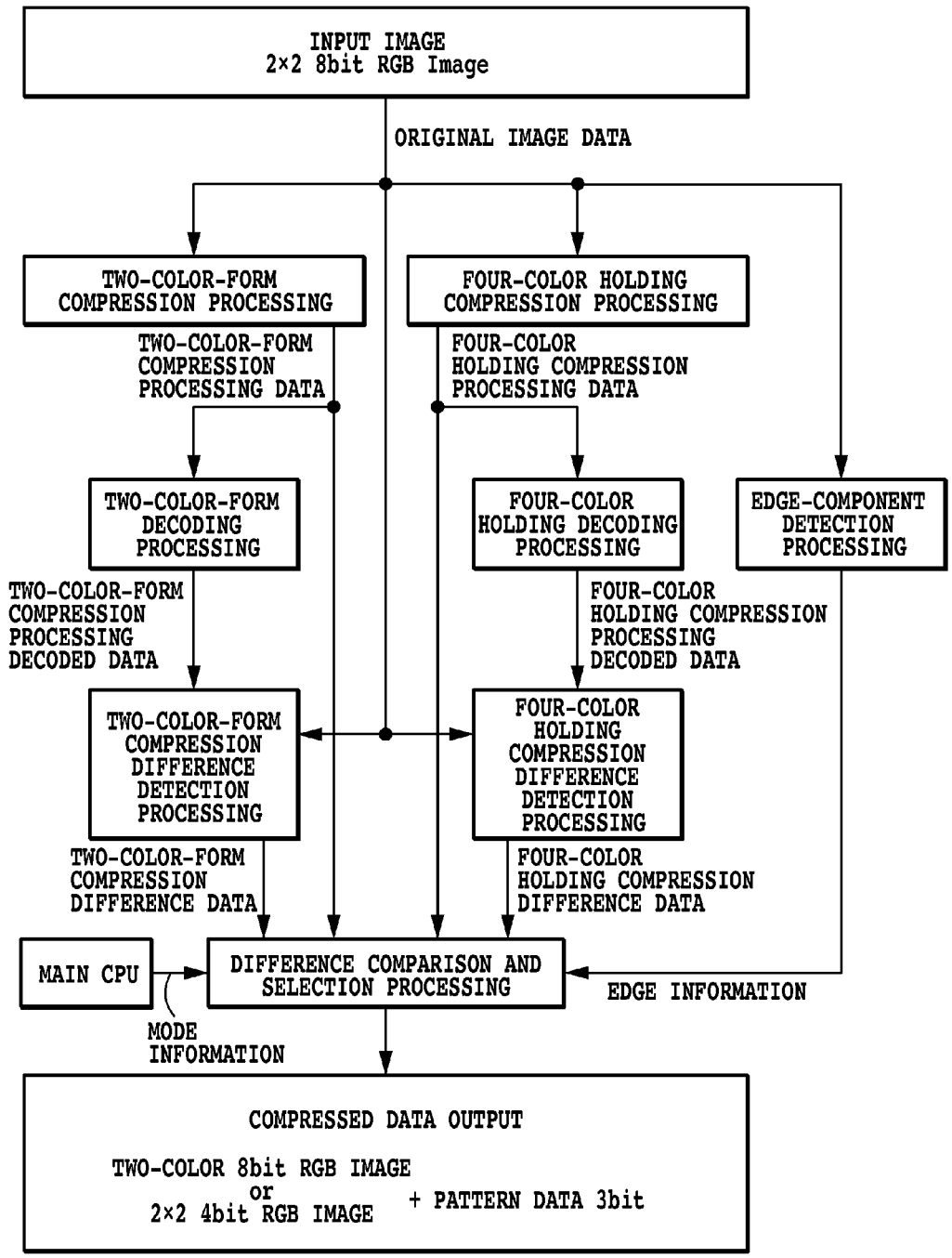
FIG. 17 is a diagram illustrating block approximation encoding compression processing in the embodiment of the present invention.

FIG. 17 is a block diagram illustrating the block approximation encoding compression processing according to the embodiment. In the block approximation encoding compression processing in the third embodiment, as in the cases of the first and second embodiments, the two types of compression processing, that is, the two-color-form compression processing and the four-color holing compression processing are performed in parallel or with a time lag therebetween. The processing result of either one of the two is selected as data after the compression processing. In the edge detection processing in the third embodiment, edge information is extracted from the original image data as in the case of the second embodiment, and the detailed description is omitted.

In the third embodiment, characteristically, the main CPU 301 for systematically controlling the image forming apparatus 100 recognizes the operation mode of the image forming apparatus 100. Then, the main CPU 301 recognizes whether the operation mode is switched to mode A or mode B to process an image after the block approximation encoding compression processing, and then inputs the result information on this recognition to the difference comparison and selection processing.

Mode A and mode B will be described in detail below.

<Detailed Description of Mode A>

Mode A is an operation mode in which the JPEG compression and decompression processing is not performed after the image processing on the image which has been subjected to the block approximation encoding compression processing. Specifically, the copy operation in the first embodiment corresponds to this mode.

Figure 18:
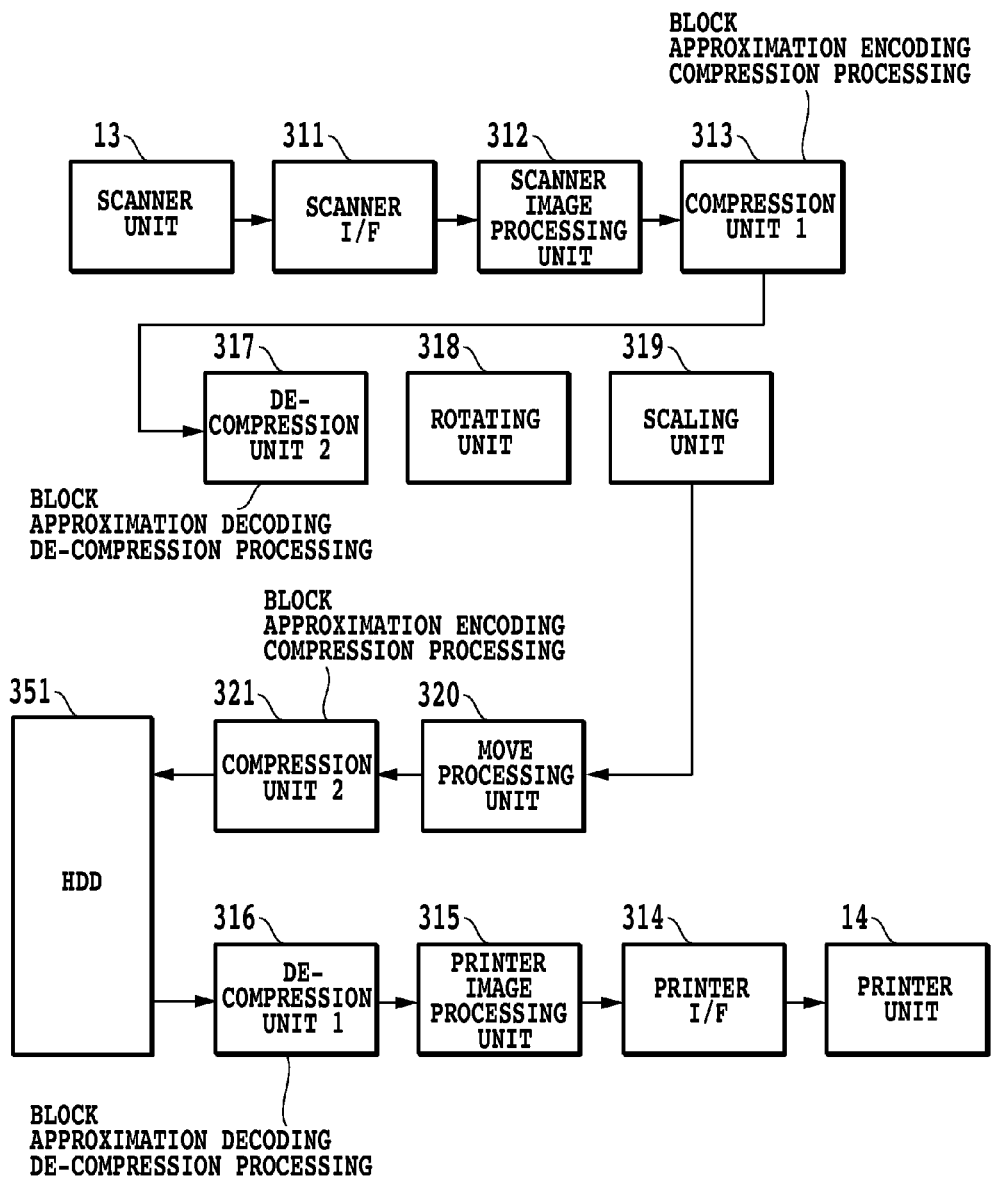
FIG. 18 is a diagram illustrating the details of coping operation in an embodiment of the present invention.

The path for the image processing in the copy operation is described with reference to FIG. 18. The processing blocks in FIG. 18 are the same as those described in detail in FIG. 12, and the detailed description is omitted.

The document read by the scanner unit 13 is sent as image data to the scanner image processing unit 312 through the scanner I/F 311. The scanner image processing unit 312 performs the processing shown in FIG. 13 on the image data.

Subsequently, the compression unit 1 313 performs block approximation encoding compression processing on the image data (original image data). The image data compressed by the compression unit 1 313 is sent through the image bus 330 and the system bus 340 to the HDD 351 for storage. The image data is sent as necessary to the page editing block 309 for image processing before being sent to and stored in the HOD 351. In the embodiment, the rotating process, the scaling process and the move process are performed on the image data which has been sent to the page editing block 309 and subjected to decompression processing for the block approximation encoding by the decompression unit 2 317.

Then, the data, which has been subjected to the block approximation encoding compression by the compression unit 2 321 in the page editing block 309, is sent to and stored in the HDD 351. After that, the data read from the HDD 351 is sent from the system bus 340 through the image bus 330 to the printer processing block 308

In the printer processing block 308 the decompression unit 1 316 decodes the image data (compression result data). At this stage, the data decompression processing is performed for the block approximation encoding. The printer image processing unit 315 performs the processing shown in FIG. 14 on the image data. The image data after being processed by the printer image processing unit 315 is sent through the printer I/F 314 to the printer unit 14.

As described above, for providing the copy operation, since the compression processing and the decompression processing are performed by use of only the block approximation encoding, mode A is selected, in which the compression and decompression processing by the JPEG processing is not performed after the block approximation encoding.

<Detailed Description of Mode B>

Mode B is an operation mode in which the JPEG compression and decompression processing is performed after the image processing on an image which has been subjected the block approximation encoding compression processing. Specifically, the operations of storing scanned data and printing out the data stored in the HDD in the first embodiment correspond to the mode B.

Figure 19:
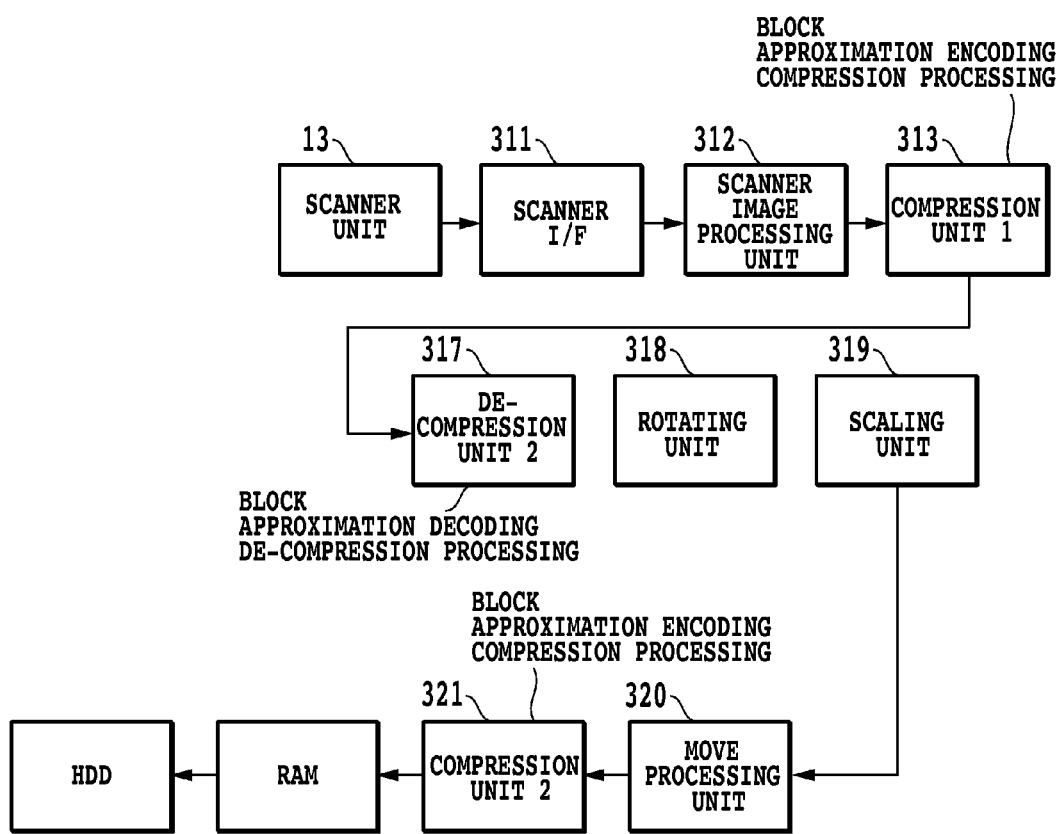
FIG. 19 is a diagram illustrating the details of operation for storing scanned image data on a HDD in the embodiment of the present invention.
Figure 20:
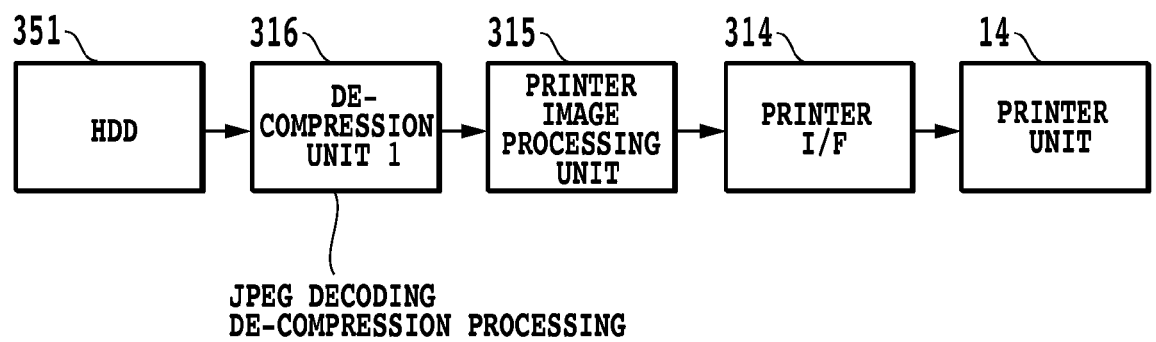
FIG. 20 is a diagram illustrating the details of operation for printing out the data stored on the HDD in the embodiment of the present invention.

The paths for the image processing in the operation of storing scanned data in the HDD and the operation of printing out data stored in the HDD are described with reference to FIGS. 19 and 20. The processing blocks in FIGS. 19 and 20 are the same as those described in detail in FIG. 12, the detailed description is omitted.

<Details of Operation for Storing Scanned Image Data in HDD>

The operation of storing scanned image data in the HDD is described in detail with reference to FIG. 19. The document scanned by the scanner unit 13 is sent as image data through the scanner I/F 311 to the scanner image processing unit 312. The scanner image processing unit 312 performs the processing shown in FIG. 13 on the image data.

Subsequently, the compression unit 1 313 performs block approximation encoding compression processing on the image data (original image data). The image data compressed by the compression unit 1 313 is sent through the image bus 330 to the page editing block 309, because, since the image data will be stored in the HDD, it is required to be compressed with a high compression ratio by JPEG. The image data is processed as necessary by the page editing block 309 and compressed by the JPEG compression processing, which is then sent to and stored in the RAM 302.

In the embodiment, the rotating process, the scaling process and the move process are performed on the image data which has been sent to the page editing block 309 and subjected to decompression processing for the block approximation encoding by the decompression unit 2 317.

Then, the data, which has been subjected to the JPEG compression processing by the compression unit 2 321 in the page editing block 309, is sent to and stored in the RAM 302. After that, the data read from the RAM 302 is given a file name and the like on the basis of user setting, and then written into a predetermined directory on the HDD 351.

<Detailed Description of Operation for Printing Out Data Stored in HDD>

Next, the operation of printing out the data stored in the HDD 351 will be described in detail with reference to FIG. 20. The data in the HDD 351 is read from the HDD 351 by the control of the main CPU 301, and sent through the system bus 340 to the printer processing block 308 in the image processing unit 304.

In the printer processing block 308 the decompression unit 1 316 decodes the image data. At this stage, since the data stored in the HDD 351 has been compressed by the JPEG, the data decompression processing is performed for the JPEG decoding.

The printer image processing unit 315 performs the processing shown in FIG. 14 on the image data. The image data after being processed by the printer image processing unit 315 is sent through the printer I/F 314 to the printer unit 14.

As described above, for providing the operation of storing scanned data in HDD and the operation of printing out data stored in HDD, mode B is selected, in which the compression and decompression processing by the JPEG processing is performed after the block approximation encoding.

To control the operation of the image forming apparatus 100, the CPU 301 recognizes a path as described above for each operation mode, then determines whether the operation corresponds to mode A or mode B, and then supplies the mode information to the difference comparison and selection processing in FIG. 17.

<Details of Block Approximation Encoding Compression Processing in the Embodiment>

As illustrated in FIG. 17, in the block approximation encoding compression processing in the embodiment, the two types of compression processing, that is, two-color-form compression processing and the four-color holding compression processing are performed in parallel. The encoding and decoding processes in the two-color-form compression processing and the encoding and decoding processes in the four-color holding compression processing performed in the third embodiment are the same as those described in detail in the first embodiment, the detailed description is omitted.

As shown in FIG. 17, the main CPU 301 calculates a difference between the original image data and each of the results of decoding the two encoding data. This difference calculation is done by similar processing to those in the first and second embodiments, and the detailed description here is omitted.

As in the case of the second embodiment, in the third embodiment edge information is produced from the original image data through the edge component detection processing, in addition to the aforementioned two types of compression processing and the calculation of difference data. Specific steps in the edge component detection processing are performed in accordance with the processing in FIG. 16 as in the case of the second embodiment.

In the difference comparison and selection processing in FIG. 17, the values of the two-color-form compression difference data and the four-color holding compression difference data are compared. Then, processing data compressed by the compression processing which leads to a smaller difference value in relation to the original image data is output as compressed output data.

When the mode information indicates mode A, the values of the two-color-form compression difference data and the four-color holding compression difference data are compared. Then, processing data compressed by the compression processing which leads to a smaller difference value in relation to the original image data is output as compressed output data. When the mode information indicates mode B, the recognition of edge information is performed on a 2×2 area-by-2×2 area basis. As a result, the processing is switched on the basis of the edge information. That is, when the mode information indicates mode B, for an area not including an edge, the values of the two-color-form compression difference data and the four-color holding compression difference data are compared. Then, processing data compressed by the compression processing which leads to a smaller difference value in relation to the original image data is output as compressed output data. When the mode information indicates mode B, for an area including an edge, regardless of the values of the difference data, the processing data which has been compressed by the four-color holding compression processing is forcibly output as the compressed output data.

Carrying out the processing as described above makes it possible to prevent or reduce the image degradation of a gradation image entered from a device such as a scanner, the gradation image suffering remarkable degradation in the two-color-form compression processing.

It is possible to prevent image degradation from occurring on a text image or a line image when the image data subjected to the two-color-form compression processing is decoded and additionally the compression data resulting from the JPEG compression processing is decoded for an image with an emphasized edge component. In this case, after the image processing is performed on the image processed by the block approximation encoding compression processing, the compression and decompression processing is able to be performed to obtain an image closer to the original image, in correspondence to presence and absence of the compression and decompression by the JPEG processing. In the embodiment, it is determined from the mode information whether or not the JPEG compression should be performed in order to select compressed output data suitable for each of the blocks. Accordingly, it is possible to optimally switch the compression result data for use after checking on a plural pixel block-by-plural pixel block basis whether or not the block is affected by the JPEG compression and decompression processing. In consequence, when the JPEG processing is executed, a reduction in image-quality degradation caused to occur on an edge of a letter and the like by the JPEG processing is made possible.

Fourth Embodiment

The aforementioned embodiments have described the case where the characteristic compression processing and the decoding process in the present invention are performed in an image forming apparatus such as an MFP. However, the characteristic compression processing and the decoding process in the present invention may be performed in another image processing apparatus such as a PC. Importance of one embodiment of the present invention is to minimize image degradation as possible when the original image data is divided into plural-pixel blocks and then compressed. To attain this object, the characteristic processing of the present invention is performed by the control unit 11 serving as the image processing device in the first to third embodiments. Accordingly, a location (apparatus) where the characteristic processing in the present invention is performed is not essential, and as long as the compression processing and the decoding process according to the embodiment of the present invention are applicable, they can be performed in any apparatus.

Fifth Embodiment

In the first to third embodiments, the number of colors used in a block is set to two and these colors and the pattern information on the colors are obtained (two-color-form compression processing), but the present invention is not limited to this. Importance in the embodiment of the present invention is that in a compression process, in the divided blocks, the number of colors is set smaller than the maximum number of colors possibly existing in each block in the entered image. That is, the number of colors in the color information obtained by the compression is set to a value smaller than the maximum number of colors in each block. The maximum number of colors becomes equal to M×N colors when the image is divided into blocks each containing M×N pixels in the block dividing processing. At this stage, if the number of colors is reduced to be equal to or smaller than (M×N−1)

colors (a number of colors smaller than M×N) in each block, this makes it possible to reduce the processing time and the processing cost.

In this case, in step 1, in each block, the colors included in the block are sorted into a smaller number of groups than (M×N−1) colors. Then, in steps 3 and 4, by assigning the colors to (M×N−1) colors or less, the image data may be compressed to obtain first compression result data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-271968, filed Oct. 22, 2008, which is hereby incorporated by reference herein in its entirety.

What is claimed is:

1. An image processing device, comprising:
    a unit configured to divide input image data into blocks each containing M×N pixels (M and N are each an integer of 1 or more, and at least one of M and N is an integer of 2 or more);
    a first compression unit configured to obtain first compression result data by assigning one of two colors to each of the M×N pixels included in each block, the first compression result data including data indicating the two colors and a pattern indicating the arrangement of the two colors;
    a second compression unit configured to, in each of the blocks, discard predetermined low-order bits of each of color components included in the block in order to compress the image data and obtain second compression result data;
    a first calculation unit configured to, in each of the blocks, determine a difference between each sum of R, G, and B data in the input image data and each sum of R, G, and B data in decompressed image data of the image data compressed by the first compression unit for each data of R, G, and B, and to determine an absolute value sum of the difference determined for each data of R, G, and B data in order to calculate first difference data;
    a second calculation unit configured to, in each of the blocks, determine a difference between each sum of R, G, and B data in the input image data and each sum of R, G, and B data in decompressed image data of the image data compressed by the second compression unit for each data of R, G, and B, and to determine an absolute value sum of the difference determined for each data of R, G, and B, in order to calculate second difference data;
    a comparison unit configured to compare the calculated first difference data and second difference data in order to determine the smaller difference from the difference in a gradation value between the first compression result data and the input image data and the difference in a gradation value between the second compression result data and the input image data; and
    an output unit configured to output, as a compression processing result of the corresponding block, either the first compression result data or the second compression result data which is determined to have smaller difference in the gradation value based on a result by the comparison unit, wherein
    in a case where the block of M×N pixels is represented by one color, the first compression unit assigns the same color to the data indicating two colors such that the amount of the first compression result data has the same value for each block, and
    the size of the first compression result data obtained by the first compression unit and the size of the second compression result data obtained by the second compression unit are the same.

2. The image processing device according to claim 1, further comprising a unit configured to detect an image edge component in each of the blocks into which the image data is divided, wherein
    for a block in which the edge component is detected, the output unit configured to output the compression result data outputs the second compression result data as the compression processing result in the block.

3. The image processing device according to claim 2, further comprising a unit configured to determine whether or not JPEG processing is performed, wherein
    in a case where it is determined that the JPEG compression is performed, for the block in which the edge component is detected, the output unit configured to output the compression result data outputs the second compression result data as the compression processing result of the block, and
    in a case where it is determined that the JPEG compression is not performed, the output unit configured to output the compression result data outputs either the first compression result data or the second compression result data which leads to a smaller one of the differences, as a compression processing result of the corresponding block.

4. The image processing device according to claim 1, wherein
    the number smaller than the M×N is 2, and
    the first compression unit sorts the colors included in the block into two groups to assign the colors to two colors.

5. The image processing device according to claim 1, further comprising:
    a unit configured to obtain pattern information concerning arrangement of colors in the block, and
    a unit configured to decompress the compression result data on the basis of the pattern information and the compression result data.

6. The image processing device according to claim 1, wherein the predetermined bits are bits in the lower half part of all the bits.

7. An image processing method, the method comprising the steps of:
    a process for dividing input image data into blocks each containing M×N pixels (M and N are each an integer of 1 or more, and at least one of M and N is an integer of 2 or more);
    a first compression process for obtaining first compression result data by assigning one of two colors to each of the M×N pixels included in each block, the first compression result data including data indicating the two colors and a pattern indicating the arrangement of the two colors;

a second compression process for, in each of the blocks, discarding predetermined low-order bits of each of color components included in the block in order to compress the image data and obtain second compression result data;

a first calculation process for, in each of the blocks, determining a difference between each sum of R, G, and B data in the input image data and each sum of R, G, and B data in decompressed image data of the image data compressed by the first compression process for each data of R, G, and B, and for determining an absolute value sum of the difference determined for each data of R, G, and B data in order to calculate first difference data;

a second calculation process for, in each of the blocks, determining a difference between each sum of R, G, and B data in the input image data and each sum of R, G, and B data in decompressed image data of the image data compressed by the second compression process for each data of R, G, and B, and for determining an absolute value sum of the difference determined for each data of R, G, and B, in order to calculate second difference data;

a comparison process for comparing the calculated first difference data and second difference data in order to determine the smaller difference from the difference in a gradation value between the first compression result data and the input image data and the difference in a gradation value between the second compression result data and the input image data; and an output process for outputting, as a compression processing result of the corresponding block, either the first compression result data or the second compression result data which is determined to have smaller difference in the gradation value based on a result by the comparison process, wherein in a case where the block of M×N pixels is represented by one color, the first compression process assigns the same color to the data indicating two colors such that the amount of the first compression result data has the same value for each block, and the size of the first compression result data obtained by the first compression process and the size of the second compression result data obtained by the second compression process are the same.

8. A non-transitory computer-readable storage medium retrievably storing a program for an image processing method, the method comprising the steps of:

a process for dividing input image data into blocks each containing M×N pixels (M and N are each an integer of 1 or more, and at least one of M and N is an integer of 2 or more);

a first compression process for obtaining first compression result data by assigning one of two colors to each of the M×N pixels included in each block, the first compression result data including data indicating the two colors and a pattern indicating the arrangement of the two colors;

a second compression process for, in each of the blocks, discarding predetermined low-order bits of each of color components included in the block in order to compress the image data and obtain second compression result data;

a first calculation process for, in each of the blocks, determining a difference between each sum of R, G, and B data in the input image data and each sum of R, G, and B data in decompressed image data of the image data compressed by the first compression process for each data of R, G, and B, and for determining an absolute value sum of the difference determined for each data of R, G, and B data in order to calculate first difference data;

a second calculation process for, in each of the blocks, determining a difference between each sum of R, G, and B data in the input image data and each sum of R, G, and B data in decompressed image data of the image data compressed by the second compression process for each data of R, G, and B, and for determining an absolute value sum of the difference determined for each data of R, G, and B, in order to calculate second difference data;

a comparison process for comparing the calculated first difference data and second difference data in order to determine the smaller difference from the difference in a gradation value between the first compression result data and the input image data and the difference in a gradation value between the second compression result data and the input image data; and an output process for outputting, as a compression processing result of the corresponding block, either the first compression result data or the second compression result data which is determined to have smaller difference in the gradation value based on a result by the comparison process, wherein in a case where the block of M×N pixels is represented by one color, the first compression process assigns the same color to the data indicating two colors such that the amount of the first compression result data has the same value for each block, and the size of the first compression result data obtained by the first compression process and the size of the second compression result data obtained by the second compression process are the same.

* * * * *